US011993087B2

(12) United States Patent
Oki et al.

(10) Patent No.: US 11,993,087 B2
(45) Date of Patent: May 28, 2024

(54) LIQUID CARTRIDGE HAVING PLATE MEMBER MOVABLE BETWEEN FIRST POSITION AND SECOND POSITION

(71) Applicant: BROTHER KOGYO KABUSHIKI KAISHA, Nagoya (JP)

(72) Inventors: Satoru Oki, Nagoya (JP); Masahiro Hayashi, Nishio (JP); Nanami Abe, Niigata (JP); Naoya Okazaki, Hashima (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 84 days.

(21) Appl. No.: 17/817,019

(22) Filed: Aug. 3, 2022

(65) Prior Publication Data

US 2023/0045115 A1 Feb. 9, 2023

(30) Foreign Application Priority Data

Aug. 4, 2021 (JP) ................................ 2021-128073

(51) Int. Cl.
*B41J 2/175* (2006.01)

(52) U.S. Cl.
CPC ....... *B41J 2/17566* (2013.01); *B41J 2/17553* (2013.01); *B41J 2002/17573* (2013.01)

(58) Field of Classification Search
CPC ...... B41J 2/175; B41J 2/1753; B41J 2/17553; B41J 2/17566; B41J 2002/17573; B41J 2002/17576
See application file for complete search history.

(56) References Cited

U.S. PATENT DOCUMENTS

2013/0320247 A1* 12/2013 Nishihara ........... G01F 23/2921 250/577
2017/0173967 A1* 6/2017 Okazaki ............... B41J 2/17513
2017/0282584 A1 10/2017 Nukui
2023/0045115 A1 2/2023 Oki et al.

FOREIGN PATENT DOCUMENTS

JP 2017-177731 A 10/2017
JP 2018-51907 A 4/2018

OTHER PUBLICATIONS

Office Action issued in related U.S. Appl. No. 17/817,050, filed Feb. 29, 2024.

* cited by examiner

*Primary Examiner* — Anh T Vo
(74) *Attorney, Agent, or Firm* — Merchant & Gould P.C.

(57) ABSTRACT

A liquid cartridge includes a case, a liquid supplying portion, a circuit board, a plate member, and a residual-amount detecting portion. The plate member is positioned rearward and above electrodes of the circuit board in an attached posture. The residual-amount detecting portion includes an optical access portion configured to receive light traveling in a left-right direction. The plate member is movable between a first position and a second position. At the first position, a portion of the plate member is positioned frontward of the optical access portion and upward of the electrode group. At the second position, a front end of the plate member is positioned closer to the residual-amount detecting portion than at the first position. The plate member at the first position and the residual-amount detecting portion define therebetween in the front-rear direction a light transmissive region whose light transmittance is higher than the plate member.

16 Claims, 16 Drawing Sheets

LIQUID CARTRIDGE HAVING PLATE MEMBER MOVABLE BETWEEN FIRST POSITION AND SECOND POSITION

REFERENCE TO RELATED APPLICATIONS

This application claims priority from Japanese Patent Application No. 2021-128073 filed on Aug. 4, 2021. The entire content of the priority application is incorporated herein by reference.

BACKGROUND ART

There has been known an inkjet recording apparatus configured to record an image on a recording sheet by ejecting ink stored in an ink cartridge through nozzles. According to one conventional inkjet recording apparatus, a new ink cartridge is configured to be attached to the apparatus each time ink is used up.

In the ink cartridge for the above-described inkjet recording apparatus, an ink supply portion is positioned on a front wall of a cartridge body. Upon attachment of the ink cartridge to the apparatus, an ink needle provided in the apparatus is inserted in the ink supply portion, thereby fixing the ink cartridge in position relative to the apparatus. Further, an IC substrate is positioned on an upper wall of the cartridge body. Upon attachment of the ink cartridge to the apparatus, the IC substrate is electrically connected to a contact of the apparatus. The upper wall of the cartridge body is further provided with a counter-detecting portion and a light-shielding plate which are configured to be detected by a residual-amount detection sensor and an attachment sensor upon attachment of the ink cartridge to the apparatus.

DESCRIPTION

Preferably, the number of sensors provided in a printer be smaller in terms of design freedom and production costs. Further, desirably, an ink cartridge be resistant to deformation which may be possibly caused by impacts impinged on the ink cartridge at the time of attachment to the printer or falling onto a floor.

In view of the foregoing, it is an object of the present disclosure to provide a liquid cartridge capable of reducing the number of sensors for a printer and hard to get damaged by impacts.

In order to attain the above and other object, according to one aspect, the present disclosure provides a liquid cartridge attachable to a printer in an attached posture by being moved in a front-rear direction crossing an up-down direction along a gravitational direction. The liquid cartridge includes a cartridge case, a liquid supply portion, a circuit board, a plate member, and a residual-amount detecting portion. The cartridge case defines a liquid storage chamber therein. The liquid supply portion protrudes frontward from a front surface of the cartridge case and is configured to supply liquid stored in the liquid storage chamber to an outside of the liquid storage chamber. The circuit board includes an electrode group including at least three electrodes. The at least three electrodes face upward and are exposed to the outside in the attached posture. The plate member is positioned rearward and upward of the electrode group in the attached posture. The plate member extends in the front-rear direction in the attached posture and has a front end movable in the front-rear direction. The residual-amount detecting portion is configured to change a state of incident light according to an amount of the liquid stored in the liquid storage chamber. The residual-amount detecting portion includes an optical access portion accessible by light traveling in a left-right direction crossing the up-down direction and the front-rear direction in the attached posture. The optical access portion includes a portion positioned above and away from the electrode group by a first distance. The plate member is movable between a first position and a second position. The plate member has a portion positioned frontward of the optical access portion and above and away from the electrode group by the first distance when the plate member is at the first position. The front end of the plate member is positioned closer to the residual-amount detecting portion when the plate member is at the second position than when the plate member is at the first position. The plate member at the first position and the residual-amount detecting portion define a light transmissive region therebetween in the front-rear direction. The light transmissive region has a light transmittance higher than a light transmittance of the plate member.

With the above structure, the plate member at the first position, the light transmissive region, and the residual-amount detecting portion can be detected by a single sensor configured to detect the light traveling in the left-right direction. Since the plate member is movable to the second position in case that an impact may be applied to the liquid cartridge during the attachment of the cartridge to the printer or in case of a fall of the liquid cartridge. Hence, the plate member is less likely to be damaged.

According to another aspect, the disclosure also provides a liquid cartridge including a cartridge case, a liquid supply portion, a circuit board, a plate member, and a cartridge detecting portion. The cartridge case defines a liquid storage chamber therein. The liquid supply portion protrudes frontward from a front surface of the cartridge case in a front-rear direction and is configured to supply liquid stored in the liquid storage chamber to an outside of the liquid storage chamber. The circuit board is positioned upward relative to and away from the liquid supply portion in an up-down direction crossing the front-rear direction. The circuit board includes an electrode group including at least three electrodes facing upward in the up-down direction and exposed to the outside. The plate member is positioned rearward and upward of the electrode group in the up-down direction. The plate member extends in the front-rear direction and has a front end movable in the front-rear direction. The cartridge detecting portion includes an optical access portion positioned upward relative to the electrode group in the up-down direction and rearward of the plate member in the front-rear direction. The optical access portion is accessible by light traveling in a left-right direction crossing the up-down direction and the front-rear direction. The optical access portion includes a portion positioned above and away from the electrode group by a first distance in the up-down direction. The plate member is movable between a first position and a second position. The plate member has a portion positioned frontward of the optical access portion and above and away from the electrode group by the first distance when the plate member is at the first position. The front end of the plate member is positioned closer to the cartridge detecting portion when the plate member is at the second position than when the plate member is at the first position. The plate member at the first position and the cartridge detecting portion are spaced apart from each other in the front-rear direction.

With the above structure, the plate member at the first position and the cartridge detecting portion can be detected by a single sensor configured to detect the light traveling in the left-right direction. Since the plate member is movable to the second position in case that an impact may be applied to the liquid cartridge during the attachment of the cartridge to a printer or in case of a fall of the liquid cartridge. Hence, the plate member is less likely to be damaged.

Figure 7:
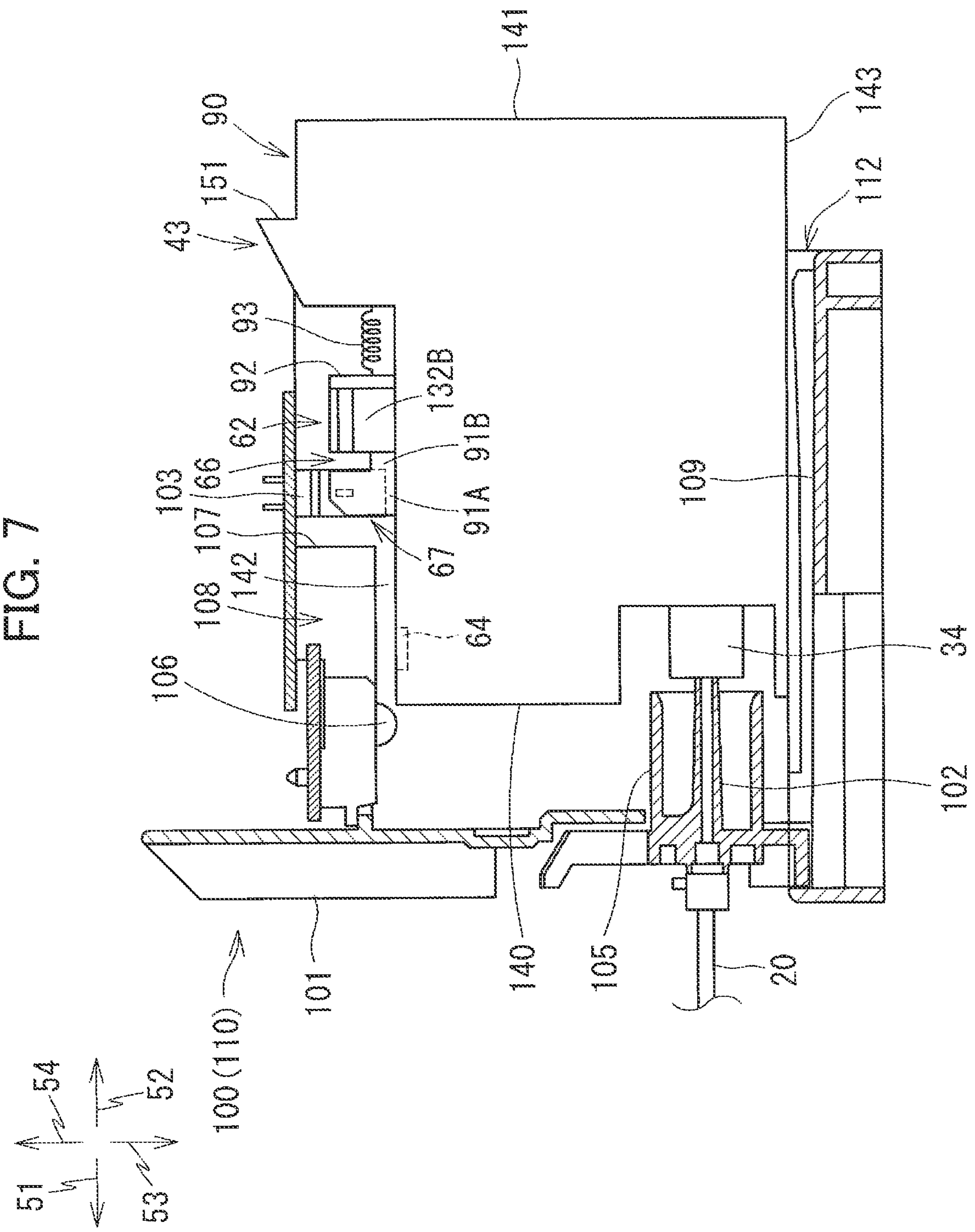

FIG. 7 is a vertical cross-sectional view of the ink cartridge 30 and the cartridge receiving portion 110 in a state where a light-shielding plate 91 is detected by a sensor 103 of the cartridge receiving portion 110.

Figure 8:
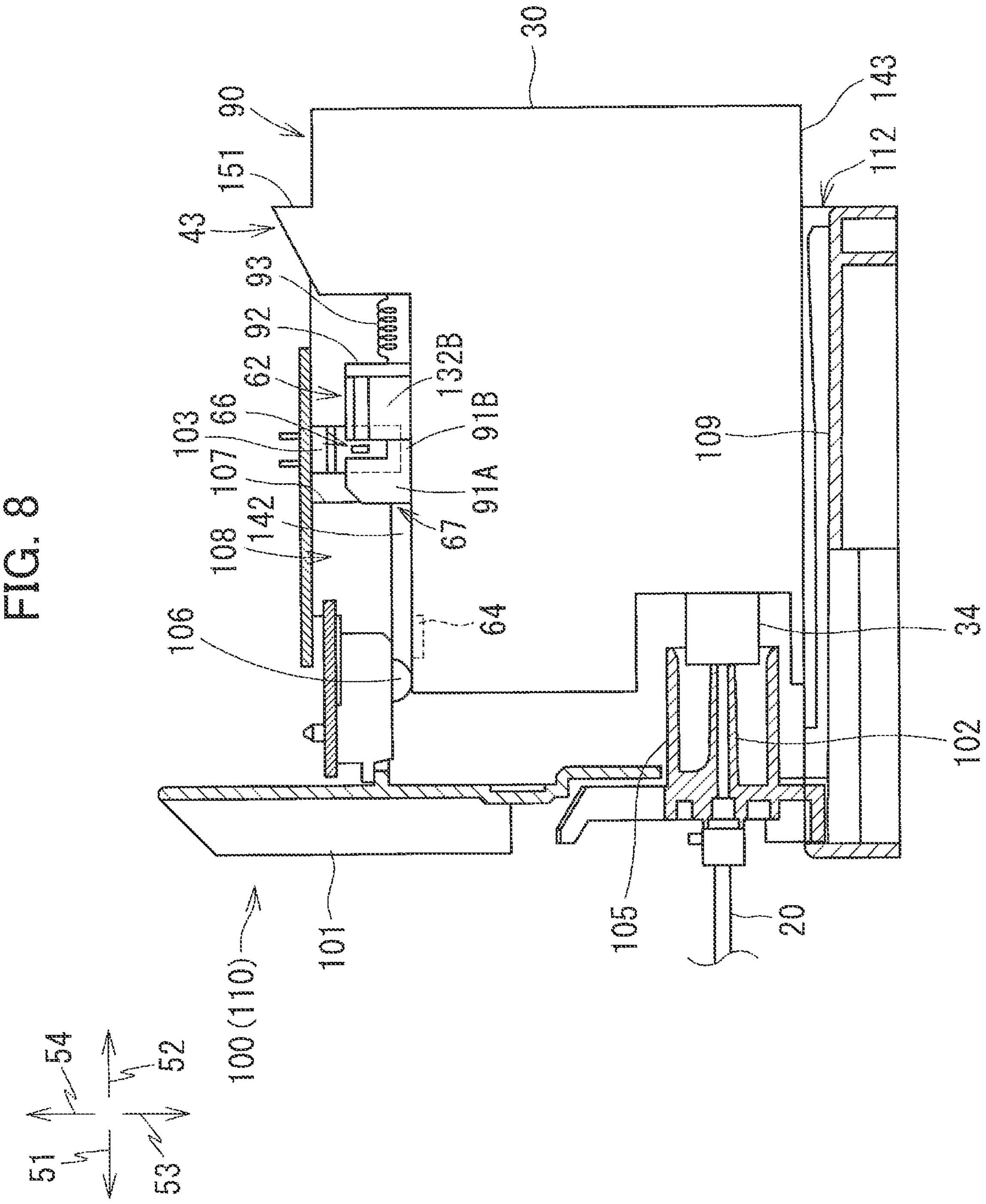

FIG. 8 is a vertical cross-sectional view of the ink cartridge 30 and the cartridge receiving portion 110 in a state where an ink needle 102 enters in an ink supply opening 71 of an ink supply portion 34, and a space 66 is positioned at an optical path 103*a* of the sensor 103.

Figure 9:
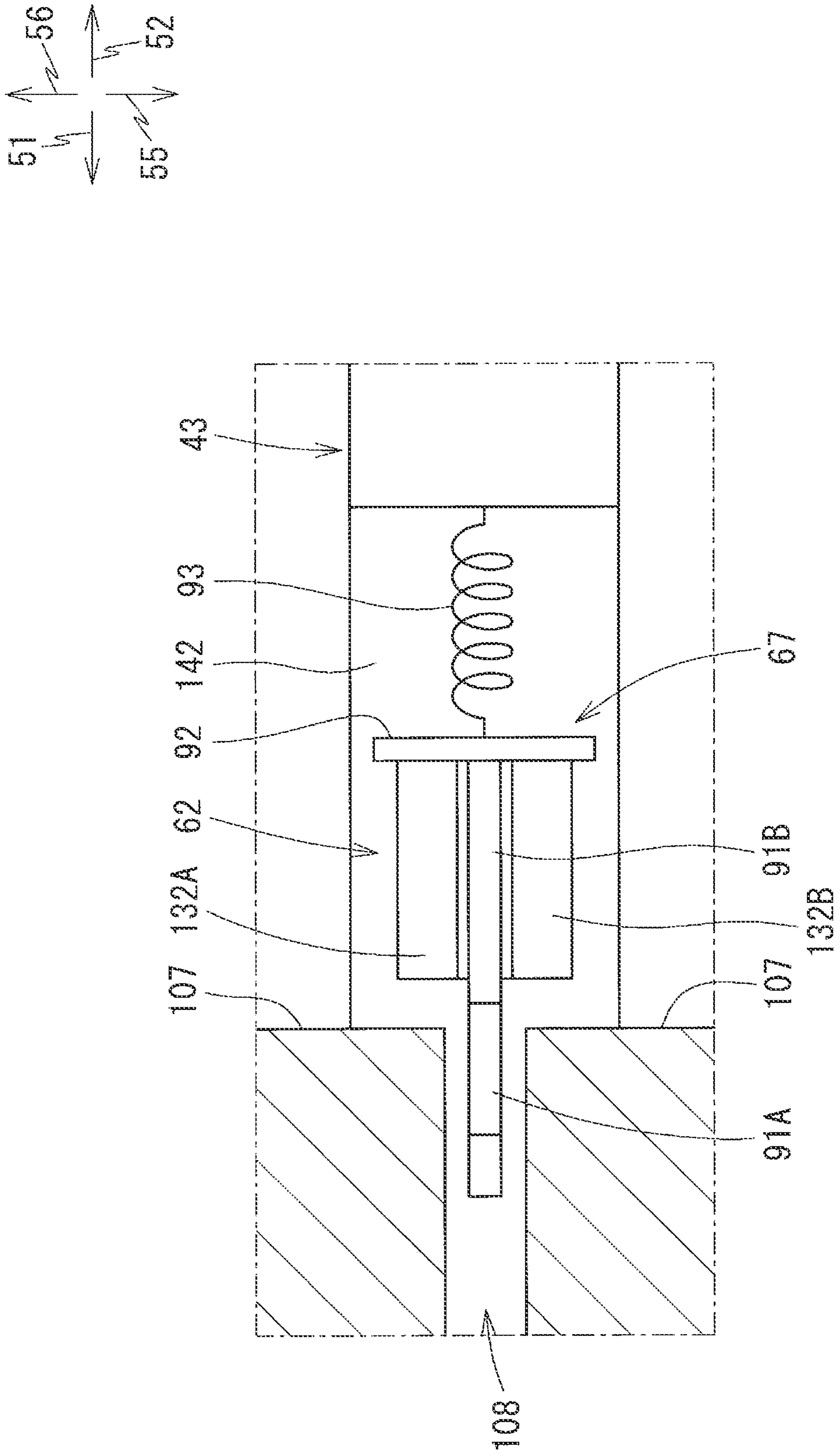

FIG. 9 is a partially enlarged plan view illustrating a state where a front portion 91A of the light-shielding plate 91 is inserted in a slit 108.

Figure 10:
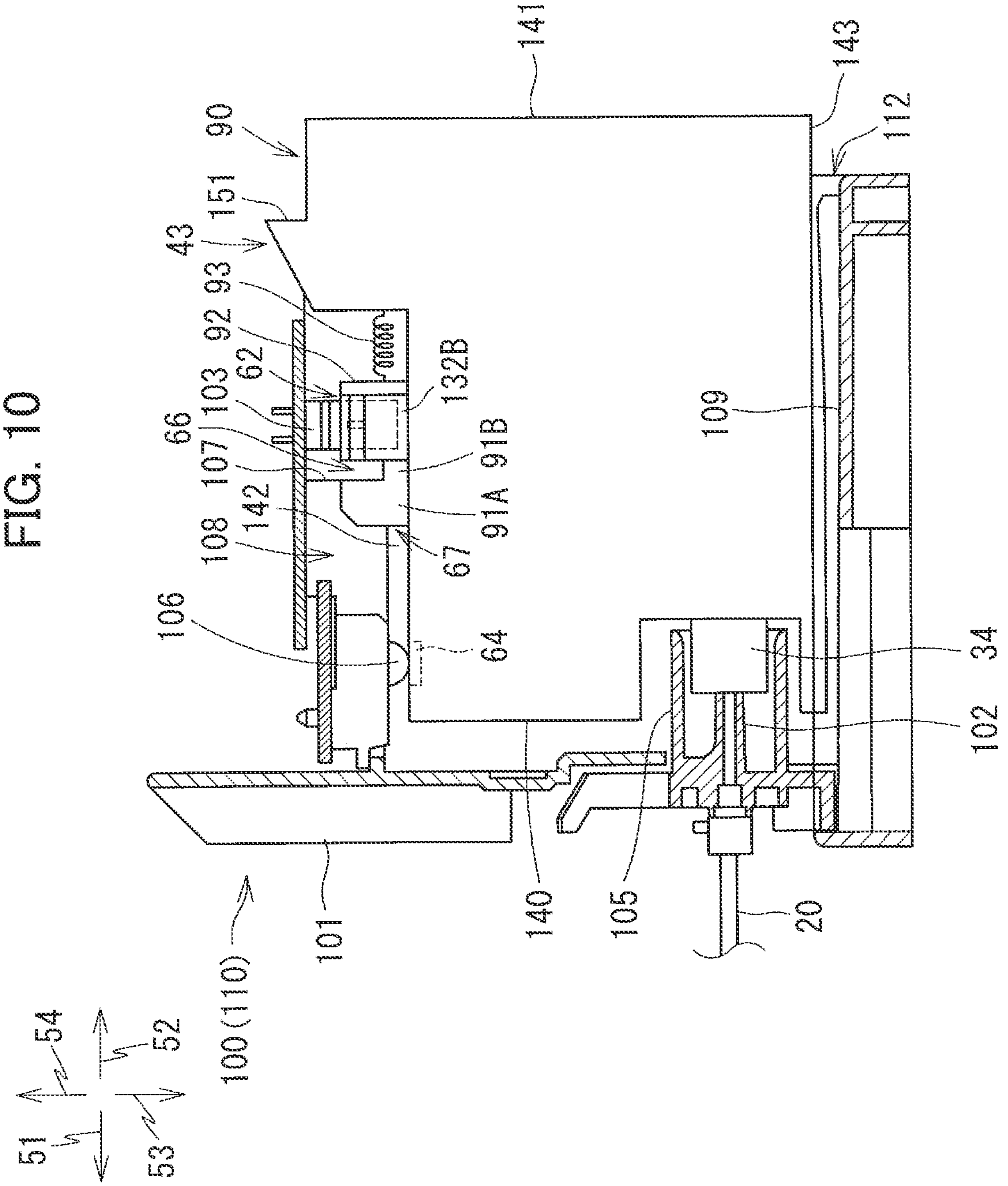

FIG. 10 is a vertical cross-sectional view of the ink cartridge 30 and the cartridge receiving portion 110 in a state where the ink cartridge 30 is fixed in position relative to the cartridge receiving portion 110.

Figure 11:
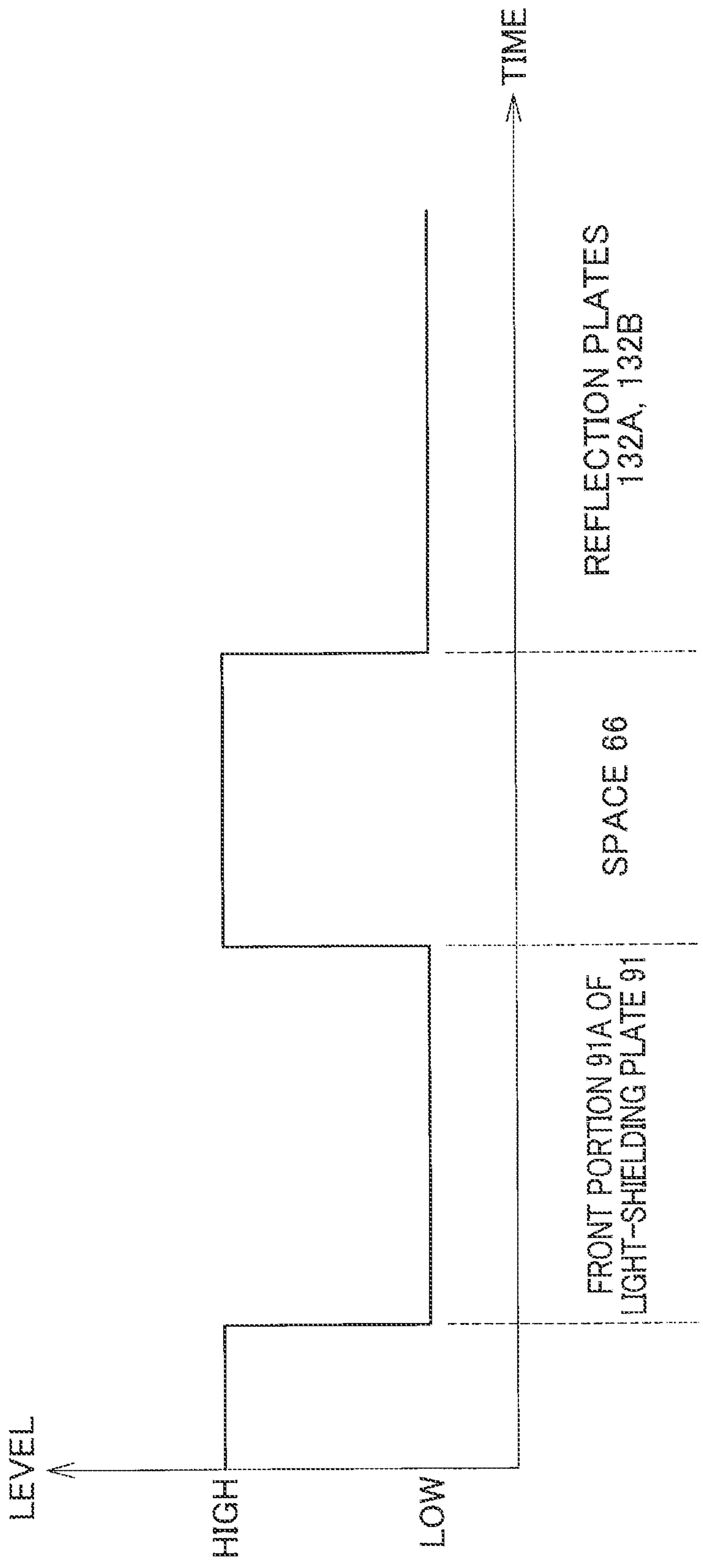

FIG. 11 is a graphical representation illustrating changes in signal outputted from the sensor 103 during an attachment of the ink cartridge 30 to the cartridge receiving portion 110.

Figure 12:
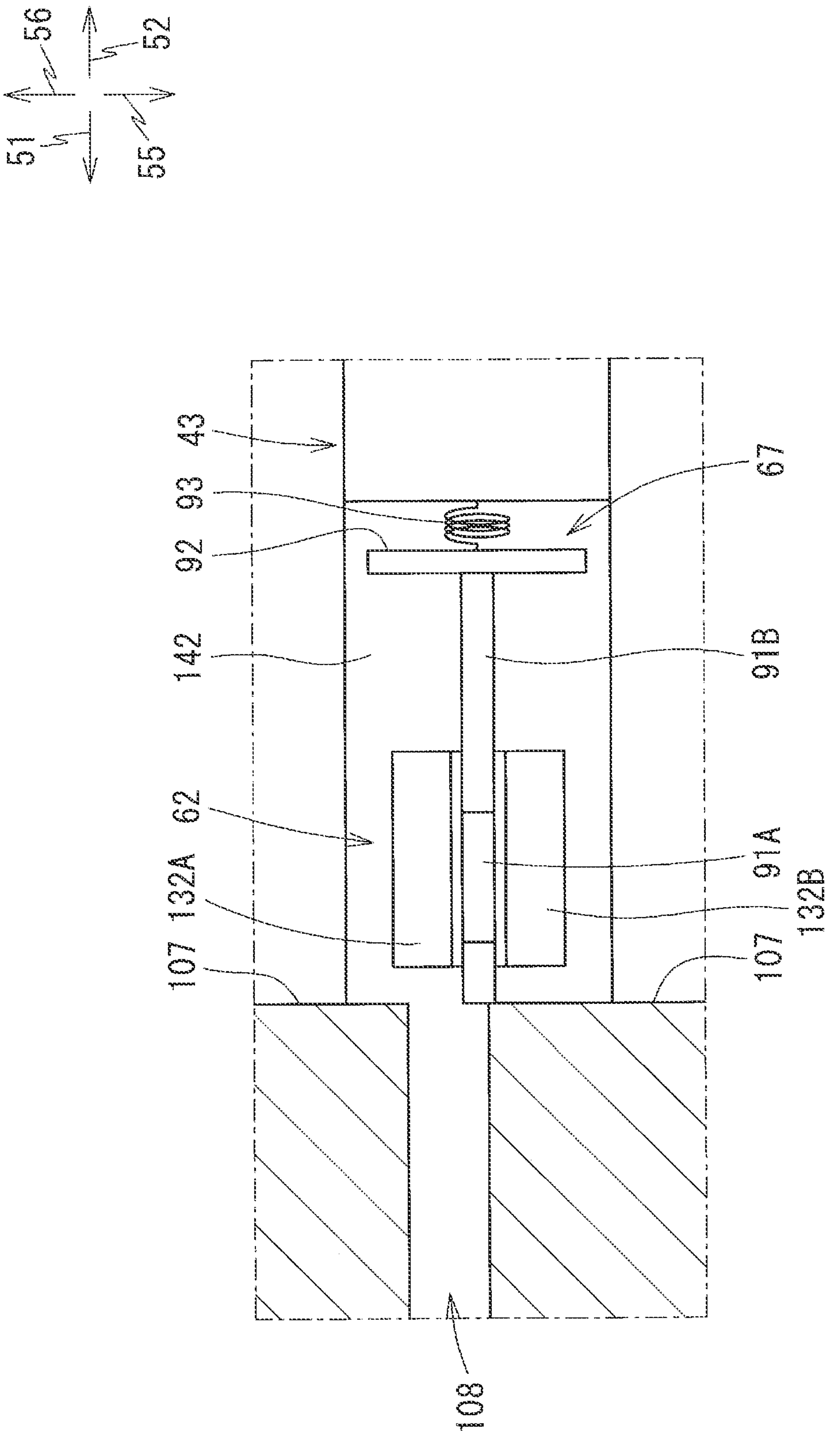

FIG. 12 is a partially enlarged plan view illustrating a state where the light-shielding plate 91 is in abutment with a wall surface 107.

Figure 13:
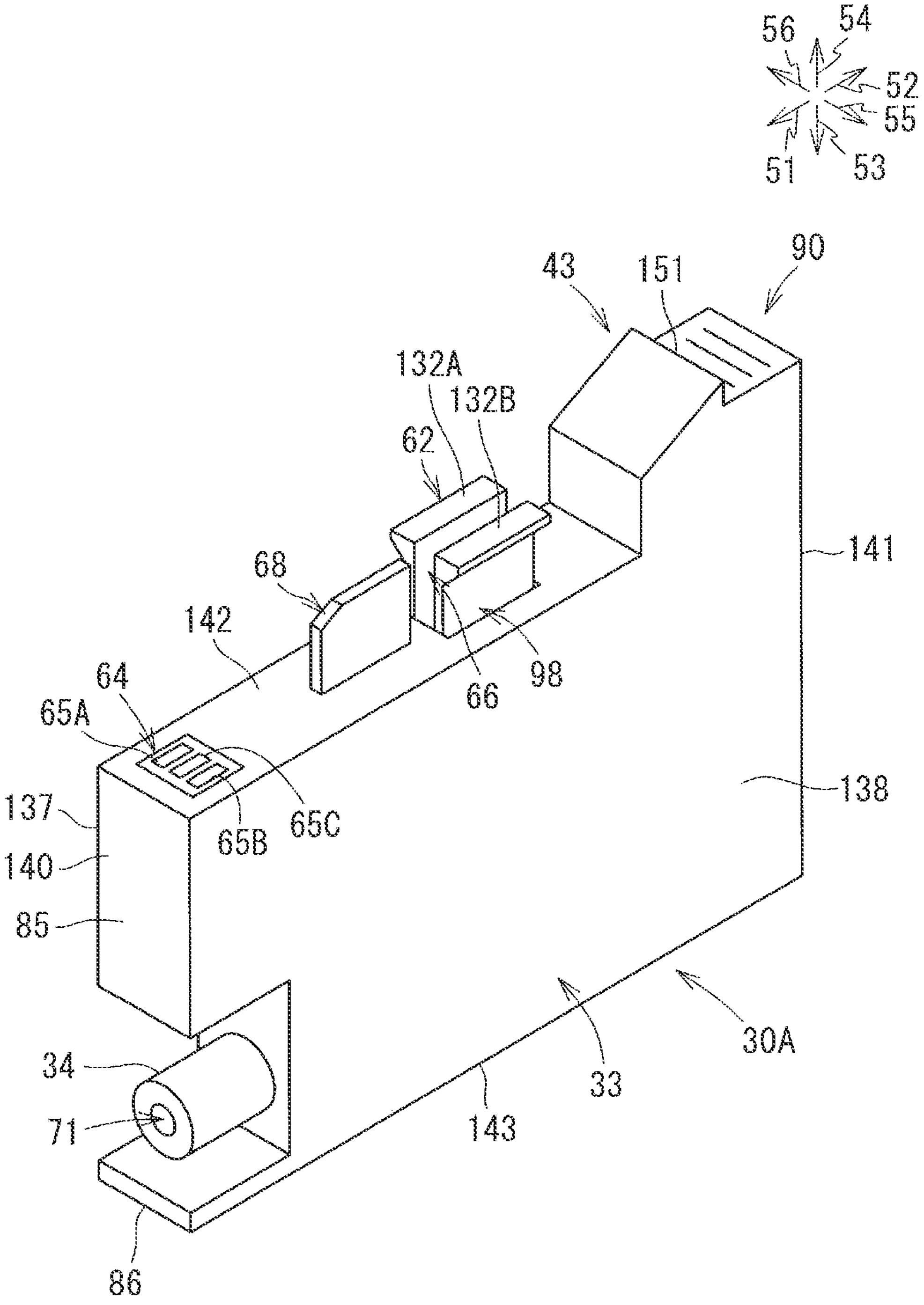

FIG. 13 is a perspective view of an ink cartridge 30A according to a first modification to the embodiment, in which the ink cartridge 30A includes a plate member 68.

Figure 14:
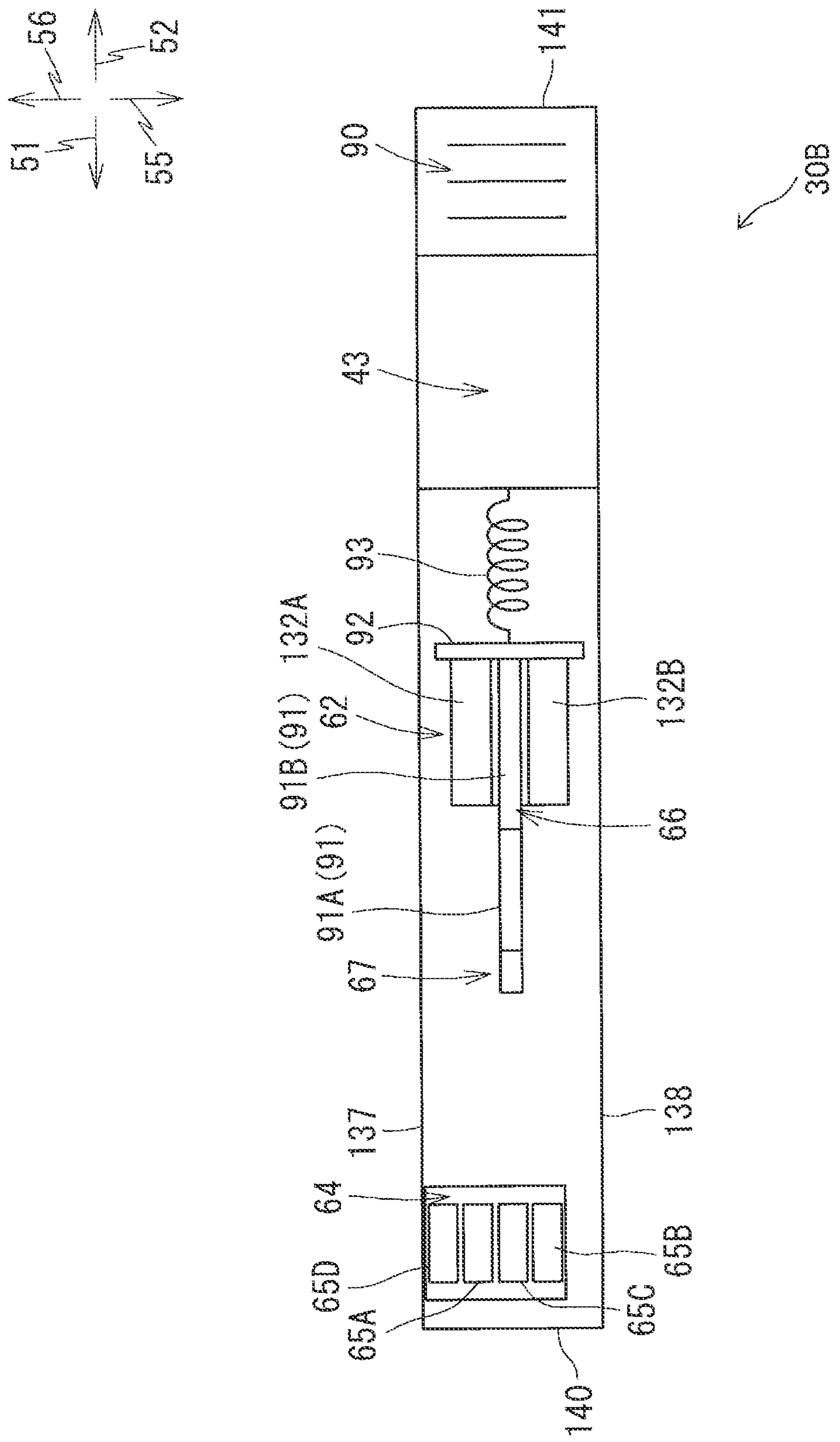

FIG. 14 is a plan view of an ink cartridge 30B according to a second modification, in which the ink cartridge 30B includes a dummy electrode 65D.

Figure 15:
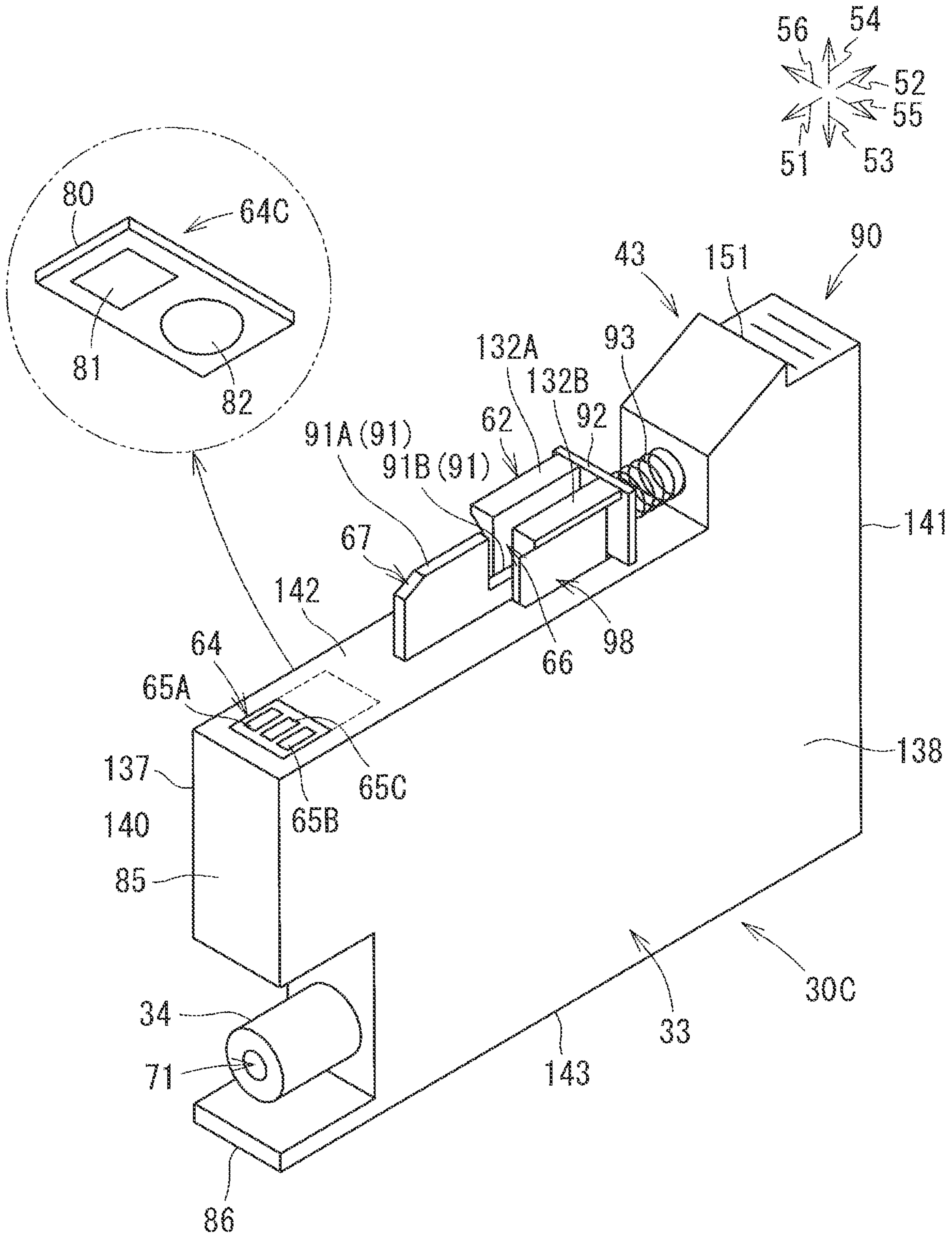

FIG. 15 is a perspective view of an ink cartridge 30C according to a third modification, in which the ink cartridge 30C includes a modified IC circuit board 64C.

Figure 16:
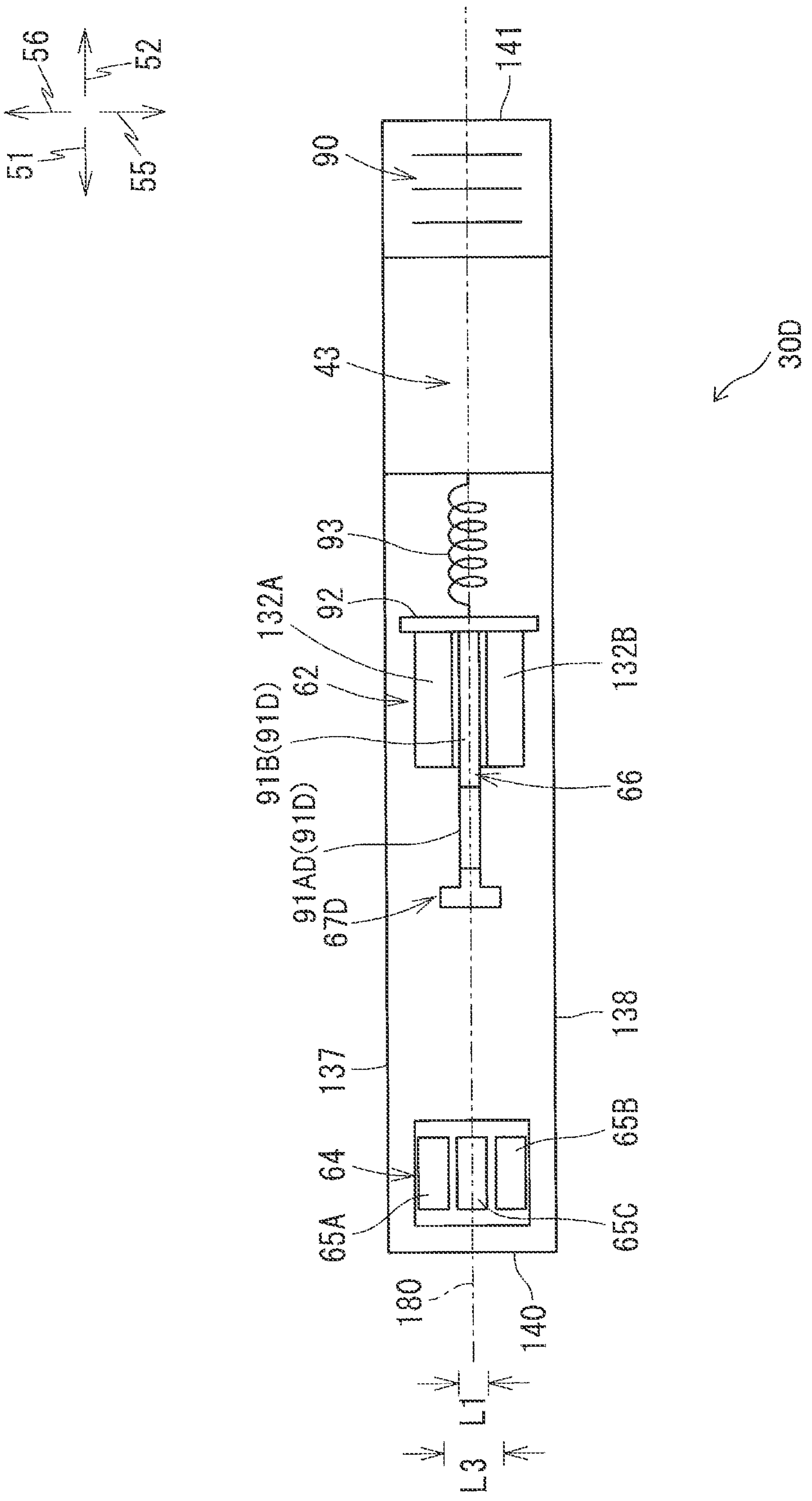

FIG. 16 is a plan view of an ink cartridge 30D according to a fourth modification.

Hereinafter, one embodiment of the present disclosure will be described with reference to the accompanying drawings. Incidentally, the embodiment described below is merely an example of the present disclosure, and it would be apparent to those skilled in the art that various modifications and variations may be made thereto without departing from the gist of the disclosure.

In the following description, the direction for insertion of an ink cartridge 30 into a cartridge receiving portion 110 will be defined as a frontward direction 51. The direction opposite to the frontward direction 51 will be defined as a rearward direction 52. That is, the rearward direction 52 is coincident with the direction for removal of the ink cartridge 30 from the cartridge receiving portion 110. In the present embodiment, the frontward direction 51 and the rearward direction 52 are both horizontal and perpendicular to the gravitational direction. However, the frontward direction 51 and the rearward direction 52 may not be horizontal. Further, in the following description, the gravitational direction will be defined as a downward direction 53, and the direction opposite to the downward direction 53 will be defined as an upward direction 54. Further, those directions perpendicular to both the frontward direction 51 and the downward direction 53 will be defined as a rightward direction 55 and a leftward direction 56. Specifically, in a state where the ink cartridge 30 has been inserted in the cartridge receiving portion 110 to assume an attached position, that is, in a state where the ink cartridge 30 is in an attached posture (attached state), the rightward direction 55 is a direction toward the right and the leftward direction 56 is a direction toward the left when the ink cartridge 30 is viewed from its front side.

Further, whenever appropriate, the frontward direction 51 and the rearward direction 52 will be collectively referred to simply as a front-rear direction 51/52. Likewise, the upward direction 54 and the downward direction 53 will be collectively referred to as an up-down direction 53/54, and the rightward direction 55 and the leftward direction 56 will be collectively referred to as a left-right direction 55/56.

Further, throughout the description, "facing frontward" implies facing in a direction that includes a frontward component, "facing rearward" implies facing in a direction that includes a rearward component, "facing downward" implies facing in a direction that includes a downward component, and "facing upward" implies facing in a direction that includes an upward component. For example, "a front surface faces frontward" may imply not only that the front surface faces frontward, but also that the front surface faces in a direction slanted relative to the frontward direction.

<Outline of Printer 10>

Figure 1:
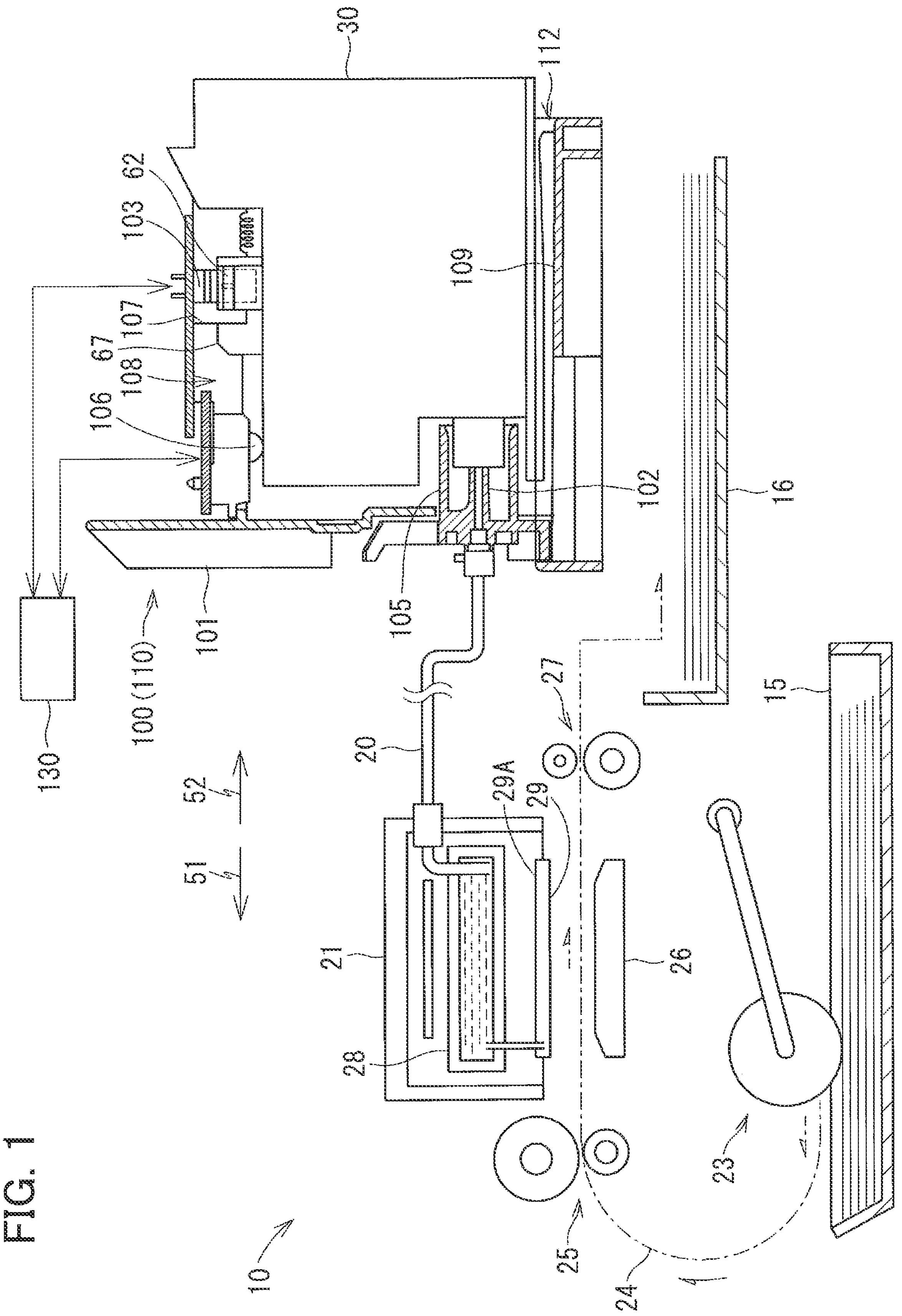
FIG. 1 is a schematic cross-sectional view schematically illustrating an internal structure of a printer 10 incorporating a cartridge receiving portion 110.

As illustrated in FIG. 1, a printer 10 is configured to selectively discharge ink droplets onto a recording sheet to record an image thereon according to an inkjet recording scheme. The printer 10 includes a recording head 21, an ink supplying device 100, and tubes 20 connecting the ink supplying device 100 to the recording head 21. The ink supplying device 100 includes the cartridge receiving portion 110. The ink cartridge 30 is configured to be attached to the cartridge receiving portion 110. The cartridge receiving portion 110 has one end face formed with an opening 112. The ink cartridge 30 is configured to be inserted frontward into the cartridge receiving portion 110 through the opening 112, and the ink cartridge 30 is configured to be removed rearward from the cartridge receiving portion 110 through the opening 112.

The ink cartridge 30 stores therein ink that can be used in the printer 10. Upon completion of the attachment of the ink cartridge 30 to the cartridge receiving portion 110, the ink cartridge 30 and the recording head 21 are connected to each other through the corresponding tube 20. The recording head 21 includes a sub-tank 28. The sub-tank 28 is configured to temporarily store the ink supplied through the tube 20. The recording head 21 is configured to eject the ink supplied from the sub tank 28 through the selective nozzles 29 according to the inkjet recording scheme.

Specifically, a head control board (not illustrated) is provided in the recording head 21. The head control board is configured to selectively apply driving voltages to piezoelectric elements 29A each being provided for each nozzle 29 to eject ink through the selected nozzle 29. Specifically, a head control board (not illustrated) is provided in the recoding head 21. The head control board is configured to selectively apply drive voltages to piezoelectric elements 29A each provided for a corresponding one of the nozzles 29 to eject ink through the selected nozzles 29. That is, the recording head 21 is configured to consume the ink stored in the ink cartridge 30 that is attached to the cartridge receiving portion 110.

The printer 10 includes a sheet supply tray 15, a sheet pick-up roller 23, a sheet conveying passage 24, a pair of conveying rollers 25, a platen 26, a pair of discharge rollers 27, and a sheet discharge tray 16. A recording sheet is fed from the sheet supply tray 15 to the sheet conveying passage 24 by the sheet pick-up roller 23, and is then conveyed onto the platen 26 by the pair of conveying rollers 25. The recording head 21 selectively ejects ink onto the recording sheet while the recording sheet moves over the platen 26, thereby recording an image on the recording sheet. The recording sheet having passed through the platen 26 is finally discharged by the pair of discharge rollers 27 onto the sheet discharge tray 16 positioned at a most downstream end in the conveying passage 24.

<Ink Supplying Device 100>

As illustrated in FIG. 1, the ink supplying device 100 is provided in the printer 10. The ink supplying device 100 is configured to supply ink to the recording head 21 provided in the printer 10. The ink supplying device 100 includes the cartridge receiving portion 110 to which the ink cartridge 30 is attachable. Incidentally, FIG. 1 illustrates a state where the attachment of the ink cartridge 30 to the cartridge receiving portion 110 is complete. That is, FIG. 1 illustrates the attached state of the ink cartridge 30 to the cartridge receiving portion 110.

<Cartridge Receiving Portion 110>

Figure 2:
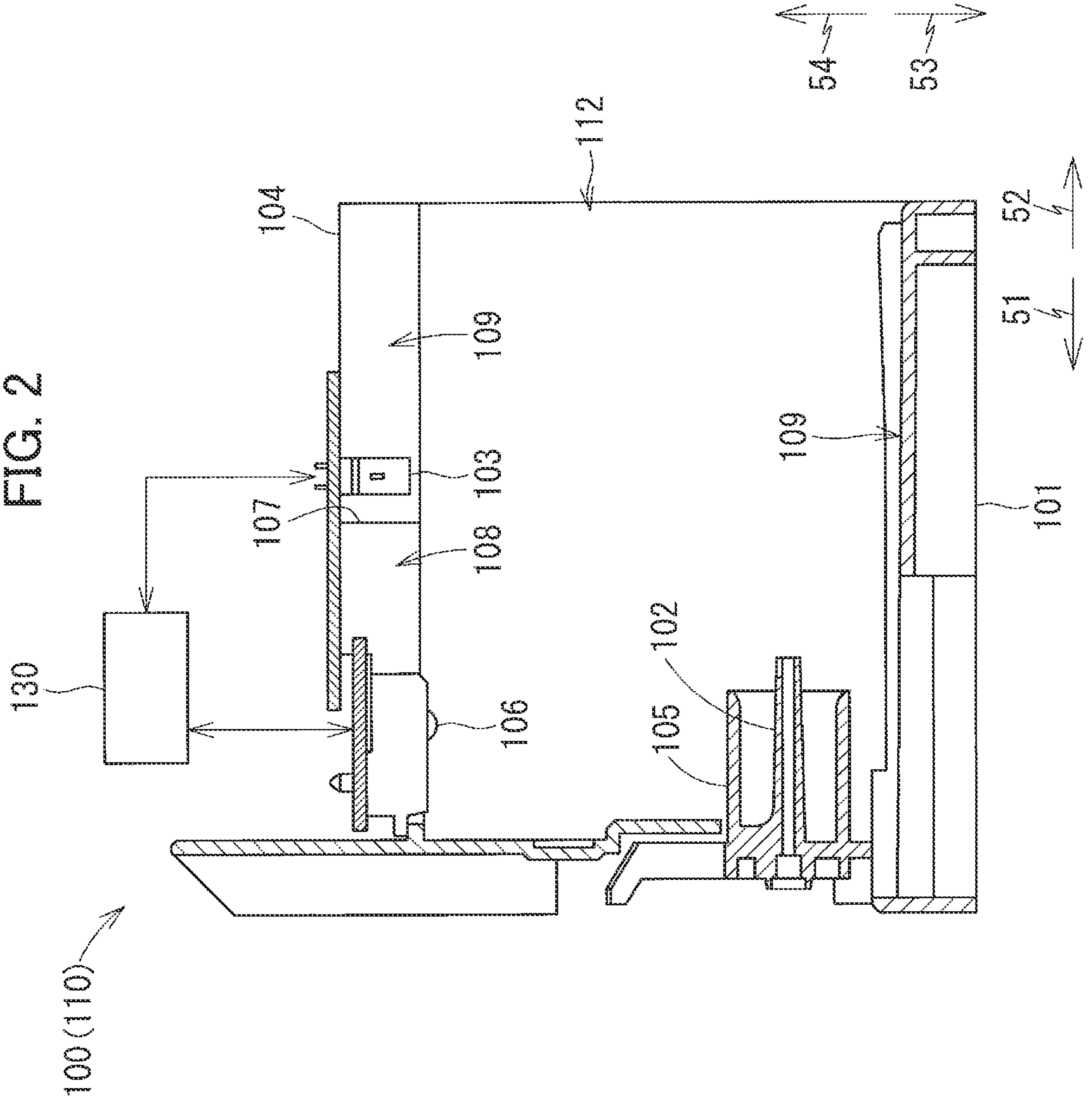
FIG. 2 is a cross-sectional view illustrating a structure of the cartridge receiving portion 110.

As illustrated in FIG. 2, the cartridge receiving portion 110 includes a casing 101, an ink needle 102, a sensor 103, and three contacts 106. Indeed, the cartridge receiving portion 110 is configured to accommodate therein four ink cartridges 30 corresponding to the colors of cyan, magenta, yellow, and black. Accordingly, four sets of the ink needle 102, the sensor 103, and the three contacts 106 are provided in the cartridge receiving portion 110, each set for each one of the four ink cartridges 30. Incidentally, the casing 101 includes a locking portion (not illustrated) for maintaining the ink cartridge 30 in the attached state relative to the cartridge receiving portion 110.

<Casing 101>

As illustrated in FIG. 2, the casing 101 constitutes a housing of the cartridge receiving portion 110. The casing 101 has a box-like shape and defines an internal space therein. The internal space is defined by a top surface constituting a top of the internal space, a bottom surface constituting a bottom of the internal space, an end surface connecting the top surface to the bottom surface, and the opening 112 facing the end surface in the front-rear direction 51/52. The opening 112 can be exposed to a user interface surface of the printer 10 which is a surface that a user faces when using the printer 10.

The ink cartridges 30 are configured to be inserted into and removed from the casing 101 through the opening 112. Each of the top surface and the bottom surface is formed with four guide grooves 109 extending in the front-rear direction 51/52. Upper and lower end portions of each ink cartridge 30 are inserted into the corresponding guide grooves 109 and guided thereby in the front-rear direction 51/52 to be received in the casing 101. Three plates 104 are also provided in the casing 101 to partition the internal space of the casing 101 into four chambers each elongated in the up-down direction 53/54. The four ink cartridges 30 are configured to be accommodated each in a corresponding one of the four chambers in the casing 101.

<Ink Needle 102>

As illustrated in FIG. 2, each ink needle 102 is in a tubular shape and made of resin. The ink needle 102 is positioned at a lower portion of the end surface of the casing 101. Each ink needle 102 is at such a position matching to an ink supply portion 34 (see FIG. 3) of the corresponding ink cartridge 30 attached to the cartridge receiving portion 110. The ink needle 102 protrudes rearward from the end surface of the casing 101.

A hollow cylindrical guide portion 105 is provided to surround each of the ink needles 102. Each guide portion 105 protrudes rearward from the end surface of the casing 101, and has a protruding end that is open rearward. Each ink needle 102 is positioned at a diametrical center of the corresponding guide portion 105. Each guide portion 105 is so shaped to allow the corresponding ink supply portion 34 to be received in the guide portions 105.

In a process that the ink cartridge 30 is inserted frontward into the cartridge receiving portion 110, that is, in the process for moving the ink cartridge 30 into the attached position, the ink supply portion 34 is entered in the corresponding guide portion 105 (see FIG. 1). As the ink cartridge 30 is inserted further frontward into the cartridge receiving portion 110, the ink needle 102 is inserted into an ink supply opening 71 of the corresponding ink supply portion 34. In this way, the ink needle 102 is fluidly connected to the ink supply portion 34, and the ink supply portion 34 is fixed in position relative to the cartridge receiving portion 110. Accordingly, the ink stored in a storage chamber 36 formed inside the ink cartridge 30 can flow into the corresponding tube 20 connected to the ink needle 102 through internal spaces of the ink supply portion 34 and ink needle 102. Incidentally, the ink needle 102 may have a flat tip end or a pointed tip end.

<Contacts 106>

The three contacts 106 are provided at the top surface of the casing 101 at a position near the end surface, while only one contact 106 is depicted in FIG. 2. The three contacts 106 are arrayed in the left-right direction 55/56 with an interval between the neighboring contacts 106. The layout of the three contacts 106 corresponds to the layout of three electrodes constituting an electrode group 65 of the ink cartridge 30 (namely, a power source electrode 65A, a signal electrode 65B, and a ground electrode 65C) as will be described later (see FIG. 3). Each contact 106 is electrically conductive and is resiliently deformable in the up-down direction 53/54. As explained above, four sets of the three contacts 106 corresponding to the four ink cartridges 30 attachable to the casing 101 are provided at the casing 101.

Each contact 106 is electrically connected to a controller 130 (see FIG. 1) through an electrical circuit. The controller 130 includes a CPU, a ROM, a RAM and the like, and may be configured as a controller for the printer 10. When the contacts 106 are electrically connected to the electrode group 65, a voltage Vc is applied to the power source electrode 65A, reading/writing of signals is performed through the signal electrode 65B, and the ground electrode 65C is grounded. Upon establishment of the electrical conduction between the contact 106 and the signal electrode 65B, the controller 130 can access data stored in an IC (not illustrated) on an IC circuit board 64 (see FIG. 3, described later) of the ink cartridge 30 through the electrical circuit.

<Sensor 103>

As illustrated in FIG. 2, the sensor 103 is provided at the top surface of the casing 101. The sensor 103 includes a light emitting portion and a light receiving portion. The light emitting portion and the light receiving portion are arranged to be spaced apart from each other in the left-right direction 55/56. Upon completion of the attachment of the ink cartridge 30 to the cartridge receiving portion 110, a counter-detecting portion 62 (see FIG. 3) of the ink cartridge 30 is positioned between the light emitting portion and the light receiving portion. In other words, the light emitting portion and the light receiving portion face each other with the counter-detecting portion 62 interposed therebetween in the state where the attachment of the ink cartridge 30 to the cartridge receiving portion 110 is complete.

The sensor 103 is configured to output different detection signals depending on whether or not light emitted from the light emitting portion is received by the light receiving portion. For example, the sensor 103 may output a low-level signal (i.e., a signal whose level is lower than a threshold level) in a case where the light receiving portion cannot receive the light emitted from the light emitting portion (that is, when an intensity of the light received at the light-receiving portion is less than a predetermined intensity). On the other hand, the sensor 103 may output a high-level signal (i.e., a signal whose signal level is equal to or higher than the threshold level) in a case where the light receiving portion can receive the light emitted from the light emitting portion (that is, when the intensity of the received light is equal to or greater than the predetermined intensity). The signal outputted from the sensor 103 is configured to be inputted into the controller 130.

As illustrated in FIG. 2, the top surface of the casing 101 is formed with four slits 108 each positioned rearward of the corresponding three contacts 106 and frontward of the corresponding sensor 103. Into each of the slits 80, a light-shielding plate 91 of the corresponding ink cartridge 30 (see FIG. 3) can be entered. Each slit 108 has a width in the left-right direction 55/56 smaller than a width in the left-right direction 55/56 of the corresponding guide groove 109. Further, a wall surface 107 facing rearward is positioned at a boundary between each guide groove 109 and each slit 108. Each slit 108 is open at a center of the wall surface 107 in the left-right direction 55/56.

<Ink Cartridge 30>

Figure 3:
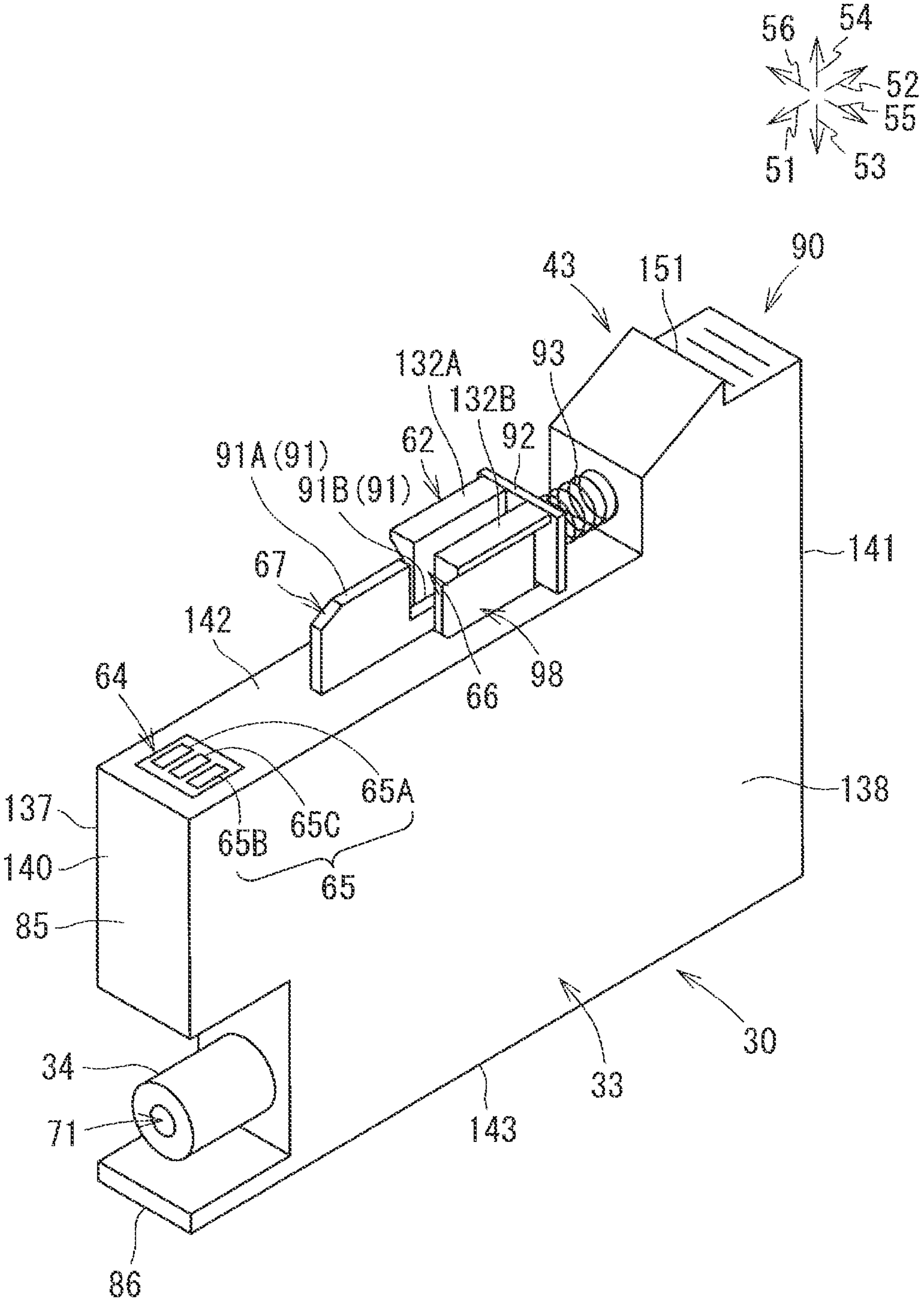
FIG. 3 is a perspective view illustrating an external structure of an ink cartridge 30 according to one embodiment.
Figure 4B:
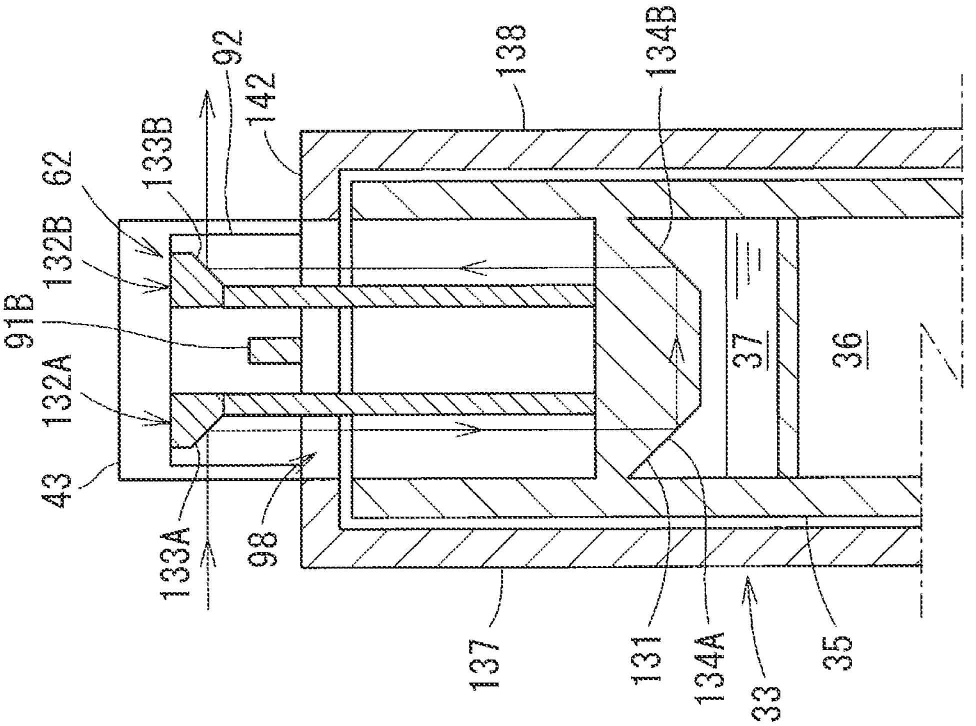
FIG. 4B illustrates the prism 131 and the reflection plates 132A and 132B in a state where the reflection surfaces 134A and 134B of the prism 131 reflect incident light.
Figure 4A:
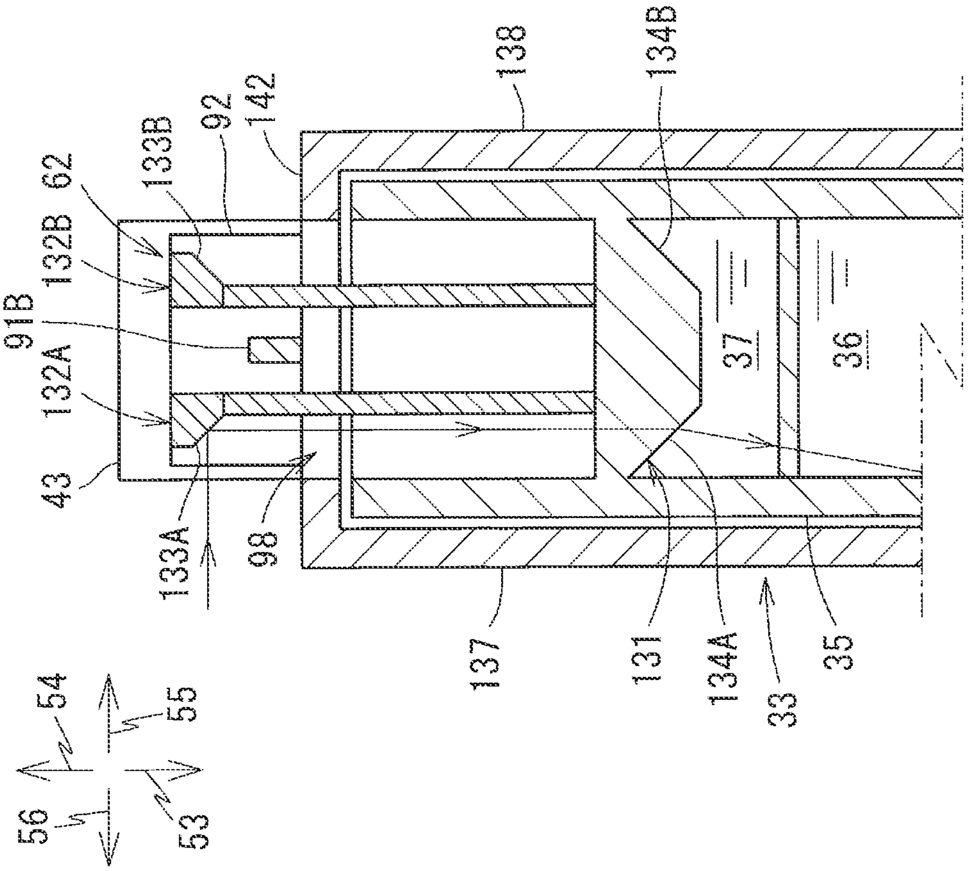
FIG. 4A illustrates a prism 131 and reflection plates 132A and 132B in a state where reflection surfaces 134A and 134B of the prism 131 do not reflect incident light.

The ink cartridge 30 illustrated in FIG. 3 is a container for storing ink therein. The storage chamber 36 and a sub-storage chamber 37 are provided inside the ink cartridge 30, as illustrated in FIGS. 4A and 4B. The ink cartridge 30 includes a cartridge case 33 forming an outer shell of the ink cartridge 30, and an internal frame 35 accommodated in the cartridge case 33. The storage chamber 36 and the sub-storage chamber 37 are defined by an internal space of the internal frame 35. Alternatively, these chambers 36, 37 may be defined by an internal space of the cartridge case 33 alone.

The ink cartridge 30 illustrated in FIG. 3 is in the attached posture. The ink cartridge 30 has a front surface 140, a rear surface 141, an upper surface 142, a lower surface 143, a left side surface 137, and a right side surface 138. In the attached posture of the ink cartridge 30 illustrated in FIG. 3, a direction from the rear surface 141 to the front surface 140 is coincident with the frontward direction 51, a direction from the front surface 140 to the rear surface 141 is coincident with the rearward direction 52, a direction from the upper surface 142 to the lower surface 143 is coincident with the downward direction 53, a direction from the lower surface 143 to the upper surface 142 is coincident with the upward direction 54, a direction from the left side surface 137 to the right side surface 138 is coincident with the rightward direction 55, and a direction from the right side surface 138 to the left side surface 137 is coincident with the leftward direction 56. Further, in the process for inserting the ink cartridge 30 into the cartridge receiving portion 110, the front surface 140 faces frontward, the rear surface 141 faces rearward, the lower surface 143 faces downward, the upper surface 142 faces upward, the left side surface 137 faces leftward, and the right side surface 138 faces rightward.

Incidentally, each of the front surface, the rear surface, the upper surface, the lower surface, and the side surfaces of the ink cartridge 30 need not be configured as one flat plane. That is, the front surface of the ink cartridge 30 can be any surface(s) that can be seen when the ink cartridge 30 in its attached posture is viewed from its front side, and that is(are) positioned frontward relative to a center of the ink cartridge 30 in the front-rear direction 51/52. The rear surface of the ink cartridge 30 can be any surface(s) that can be seen when the ink cartridge 30 in its attached posture is viewed from its rear side, and that is(are) positioned rearward relative to the center of the ink cartridge 30 in the front-rear direction 51/52. The upper surface of the ink cartridge 30 can be any surface(s) that can be seen when the ink cartridge 30 in its attached posture is viewed from above, and that is(are) positioned upward relative to a center of the ink cartridge 30 in the up-down direction 53/54. The lower surface of the ink cartridge 30 can be any surface(s) that can be seen when the ink cartridge 30 in its attached posture is viewed from below, and that is(are) positioned downward relative to the center of the ink cartridge 30 in the up-down direction 53/54. The same is applied to the side surfaces of the ink cartridge 30.

The ink cartridge 30 has a generally flat shape having a width in the left-right direction 55/56, a height in the up-down direction 53/54, and a depth in the front-rear direction 51/52, the width being smaller than the height and the depth. The front surface 140 of the cartridge case 33 faces frontward and the rear surface 141 of the cartridge case 33 faces rearward while the ink cartridge 30 is inserted in the cartridge receiving portion 110. The front surface 140 and the rear surface 141 are arranged with the storage chamber 36 interposed therebetween.

As illustrated in FIG. 3, a protruding portion 43 is provided on the upper surface 142 of the cartridge case 33. The protruding portion 43 extends in the front-rear direction 51/52 and has a center in the left-right direction 55/56 coincident with the center of the upper surface 142 in the left-right direction 55/56. The protruding portion 43 has a locking surface 151 facing rearward. The locking surface 151 extends in the up-down direction 53/54 and the left-right direction 55/56. The locking surface 151 facing rearward is configured to contact the locking portion (not illustrated) of the cartridge receiving portion 110) from frontward thereof in the attached state of the ink cartridge 30 to the cartridge receiving portion 110. This contact of the locking surface 151 with the locking portion can hold the ink cartridge 30 in the attached state relative to the cartridge receiving portion 110.

An operating portion 90 is also provided on the upper surface 142 of the cartridge case 33 at a position rearward of the locking surface 151. Incidentally, in the present embodiment, the locking surface 151 is brought into contact with the locking portion as the ink cartridge 30 is tilted to move the locking surface 151 upward in the process of attachment of the ink cartridge 30 to the cartridge receiving portion 110. However, the locking surface 151 may be brought into contact with the locking portion as the ink cartridge 30 simply moves in the front-rear direction 51/52 without tilting relative thereto.

The front surface 140 of the cartridge case 33 is formed with a first protruding portion 85 and a second protruding portion 86. The first protruding portion 85 is positioned on an upper end portion of the cartridge case 33 and protrudes frontward. The first protruding portion 85 has a protruding end surface that constitutes a part of the front surface 140.

The second protruding portion 86 is positioned at a lower end portion of the cartridge case 33, i.e., below the ink supply portion 34, and protrudes frontward from the lower end portion of the cartridge case 33. The second protruding portion 86 has a protruding end face positioned frontward of the front end (ink supply opening 71) of the ink supply portion 34.

A hole 98 is open at the upper surface 142 of the cartridge case 33. The hole 98 penetrates through an upper wall of the cartridge case 33 vertically (see FIGS. 4A and 4B). The counter-detecting portion 62 extends vertically through the hole 98 to be exposed to an outside of the cartridge case 33.

As illustrated in FIGS. 4A and 4B, the counter-detecting portion 62 includes a prism 131, a first reflection plate 132A, and a second reflection plate 132B. The first reflection plate 132A and the second reflection plate 132B are so arranged to be positioned between the light emitting portion and the light receiving portion of the sensor 103 when the ink cartridge 30 is attached to the cartridge receiving portion 110. The first reflection plate 132A and the second reflection plate 132B are spaced part from each other in the left-right direction 55/56. Specifically, the first reflection plate 132A is positioned leftward of the second reflection plate 132B when the ink cartridge 30 is viewed from its front side. The first reflection plate 132A and the second reflection plate 132B define a gap therebetween in the left-right direction 55/56. This gap has a dimension in the left-right direction 55/56 greater than a dimension in the left-right direction 55/56 of the light-shielding plate 91 (described later). The light-shielding plate 91 is movable in the front-rear direction 51/52 inside the gap between the first reflection plate 132A and the second reflection plate 132B.

The first reflection plate 132A is supported by the internal frame 35, and extends upward through the hole 98 of the cartridge case 33 up to a position above the upper surface 142. The first reflection plate 132A has a first reflection surface 133A. The first reflection surface 133A faces diagonally leftward and downward and is slanted by 45 degrees with respect to the left-right direction 55/56. The first reflection surface 133A can reflect the light emitted from the light emitting portion of the sensor 103 and traveling in the rightward direction 55 to redirect the light in the downward direction 53.

The second reflection plate 132B is supported by the internal frame 35, and extends upward through the hole 98 of the cartridge case 33 up to a position above the upper surface 142. The second reflection plate 132B has a second reflection surface 133B. The second reflection surface 133B faces diagonally rightward and downward and is slanted by 45 degrees with respect to the left-right direction 55/56. The second reflection surface 133B can reflect the light traveling in the upward direction 54 from the prism 131 to redirect the light in the rightward direction 55 toward the light receiving portion.

The prism 131 is provided in the internal frame 35. The prism 131 has a first reflection surface 134A and a second reflection surface 134B. The first and second reflection surfaces 134A, 134B are designed to contact the ink stored in the sub-storage chamber 37. The prism 131 is made from, for example, synthetic resin having optical transparency. The sub-storage chamber 37 is positioned between the storage chamber 36 and the ink supply portion 34 in an ink flow path of the ink cartridge 30. The level of the ink stored in the sub-storage chamber 37 is designed to be lowered after all the ink stored in the storage chamber 36 flows out therefrom.

The prism 131 is positioned below the first reflection surface 133A and the second reflection surface 133B. The first reflection surface 134A of the prism 131 is positioned directly below the first reflection surface 133A of the first reflection plate 132A. The first reflection surface 134A faces diagonally leftward and downward and is inclined by 45 degrees with respect to the left-right direction 55/56. The second reflection surface 134B of the prism 131 is positioned directly below the second reflection surface 133B of the second reflection plate 132B. The second reflection surface 134B faces diagonally rightward and downward and is inclined by 45 degrees with respect to the left-right direction 55/56.

The first reflection surface 134A and the second reflection surface 134B of the prism 131 refract light in a state where the first reflection surface 134A and the second reflection surface 134B are in contact with the ink. On the other hand, the first reflection surface 134A and the second reflection surface 134B reflect light in a state where the first reflection surface 134A and the second reflection surface 134B are not in contact with the ink. That is, whether the prism 131 refracts or reflects the incident light is dependent on whether or not the reflection surfaces 134A, 134B are in contact with the ink stored in the sub-storage chamber 37. In other words, the reflection surfaces 134A, 134B of the prism 131 can change the traveling direction of the incident light depending on whether the reflection surfaces 134A, 134B are in contact with the ink or not.

As illustrated in FIG. 4A, in the state where the first and second reflection surfaces 134A, 134B of the prism 131 are in contact with the ink stored in the sub-storage chamber 37, the light emitted from the light emitting portion of the sensor 103 is reflected by the first reflection surface 133A of the first reflection plate 132A downward toward the prism 131, and is then refracted by the first reflection surface 134A of the prism 131 to travel outside toward the sub-storage chamber 37. Hence, the sensor 103 outputs a low-level signal.

On the other hand, as illustrated in FIG. 4B, in the state where the level of the ink stored in the sub-storage chamber 37 is lowered below the first and second reflection surfaces 134A, 134B of the prism 131 so that the first and second reflection surfaces 134A, 134B no longer contact the ink, the light emitted from the light emitting portion of the sensor 103 is reflected by the first reflection surface 133A of the first reflection plate 132A and is redirected toward the first reflection surface 134A of the prism 131. The light is then reflected at the first reflection surface 134A and is directed toward the second reflection surface 134B of the prism 131. The light is then reflected at the second reflection surface 134B and is directed upward toward the second reflection surface 133B of the second reflection plate 132B. The light is then reflected by the second reflection surface 133B to be directed rightward toward the light receiving portion of the sensor 103. As a result, the sensor 103 outputs a high-level signal. In this way, the sensor 103 can output different signals depending on whether the prism 131 is in contact with the ink in the sub-storage chamber 37. The controller 130 can thus determine whether the ink in the sub-storage chamber 37 is at the level of the prism 131 or lower based on the signal outputted from the sensor 103.

As illustrated in FIG. 3, the IC circuit board 64 is provided on the upper surface 142 of the cartridge case 33 and above the first protruding portion 85, that is, directly above the ink supply portion 34. The IC circuit board 64 can be electrically connected to the three contacts 106 (see FIG. 2) arrayed in the left-right direction 55/56 in the process for attaching the ink cartridge 30 to the cartridge receiving portion 110. The IC circuit board 64 is electrically connected to the three contacts 106 of the cartridge receiving portion 110 in the attached state of the ink cartridge 30 to the cartridge receiving portion 110.

The IC circuit board 64 includes a rigid board made from glass epoxy, the IC (not illustrated), and the electrode group 65. The IC and the electrode group 65 are surface-mounted on the rigid board. The IC is a semiconductor integrated circuit, and stores therein readable/writable data indicative of information on the ink cartridge 30 such as a lot number, a date of manufacture, and the color of ink.

The electrode group 65 is mounted on the upper surface of the rigid board and is exposed thereon so as to be accessible. The electrode group 65 is electrically connected to the IC. The electrode group 65 is also electrically connectable to a power source (not illustrated) of the printer 10 when the ink cartridge 30 is attached to the cartridge receiving portion 110. Alternatively, in a case where the ink cartridge 30 includes a battery as a power source, the electrode group 65 may be electrically connected to the battery for receiving power therefrom.

Figure 6:
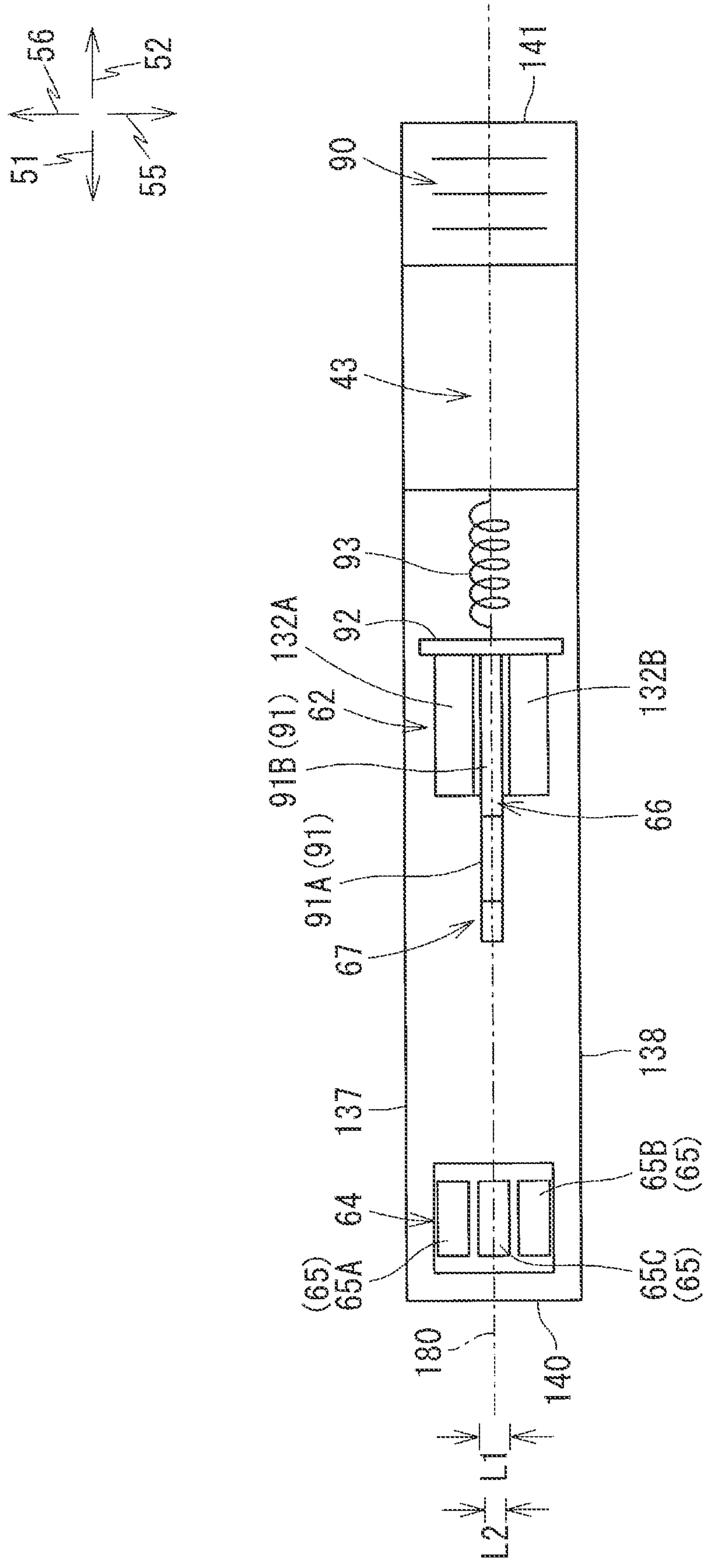
FIG. 6 is a plan view of the ink cartridge 30.

As illustrated in FIG. 6, the electrode group 65 includes the power source electrode 65A, the signal electrode 65B, and the ground electrode 65C. The power source electrode 65A, the signal electrode 65B, and the ground electrode 65C respectively extend in the front-rear direction 51/52, and are arrayed to be spaced apart from each other in the left-right direction 55/56. Specifically, the ground electrode 65C is positioned at the center of the upper surface 142 in the left-right direction 55/56. The power source electrode 65A is positioned rightward of the ground electrode 65C, and the signal electrode 65B is positioned leftward of the ground electrode 65C in the left-right direction 55/56. Alternatively, the positions of the power source electrode 65A and the signal electrode 65B may be interchanged with each other. The power source electrode 65A and the signal electrode 65B are electrically connected to each other.

As illustrated in FIG. 3, the ink supply portion 34 protrudes frontward from the lower end portion of the front surface 140. That is, the ink supply portion 34 extends in the front-rear direction 51/52. The ink supply portion 34 has a hollow cylindrical shape. The ink supply opening 71 is formed at the tip end (front end) of the ink supply portion 34. The ink supply opening 71 is in communication with the storage chamber 36 and the sub-storage chamber 37. Although not illustrated in the drawings, the ink supply opening 71 can be opened or closed by a valve accommodated in the ink supply portion 34.

Incidentally, the valve may not be provided in the ink supply portion 34 for opening and closing the ink supply opening 71. Alternatively, for example, the ink supply opening 71 may be initially closed by a film. The film may be broken by the ink needle 102 during the insertion of the ink cartridge 30 into the cartridge receiving portion 110, so that the tip end portion of the ink needle 102 can enter into the internal space of the ink supply portion 34 through the ink supply opening 71. Still alternatively, the ink supply opening 71 may be closed by elastic deformation of an elastic member such as rubber and elastomer. The ink supply opening 71 may be forcibly opened when the ink needle 102 is pierced into the ink supply opening 71.

Figure 5:
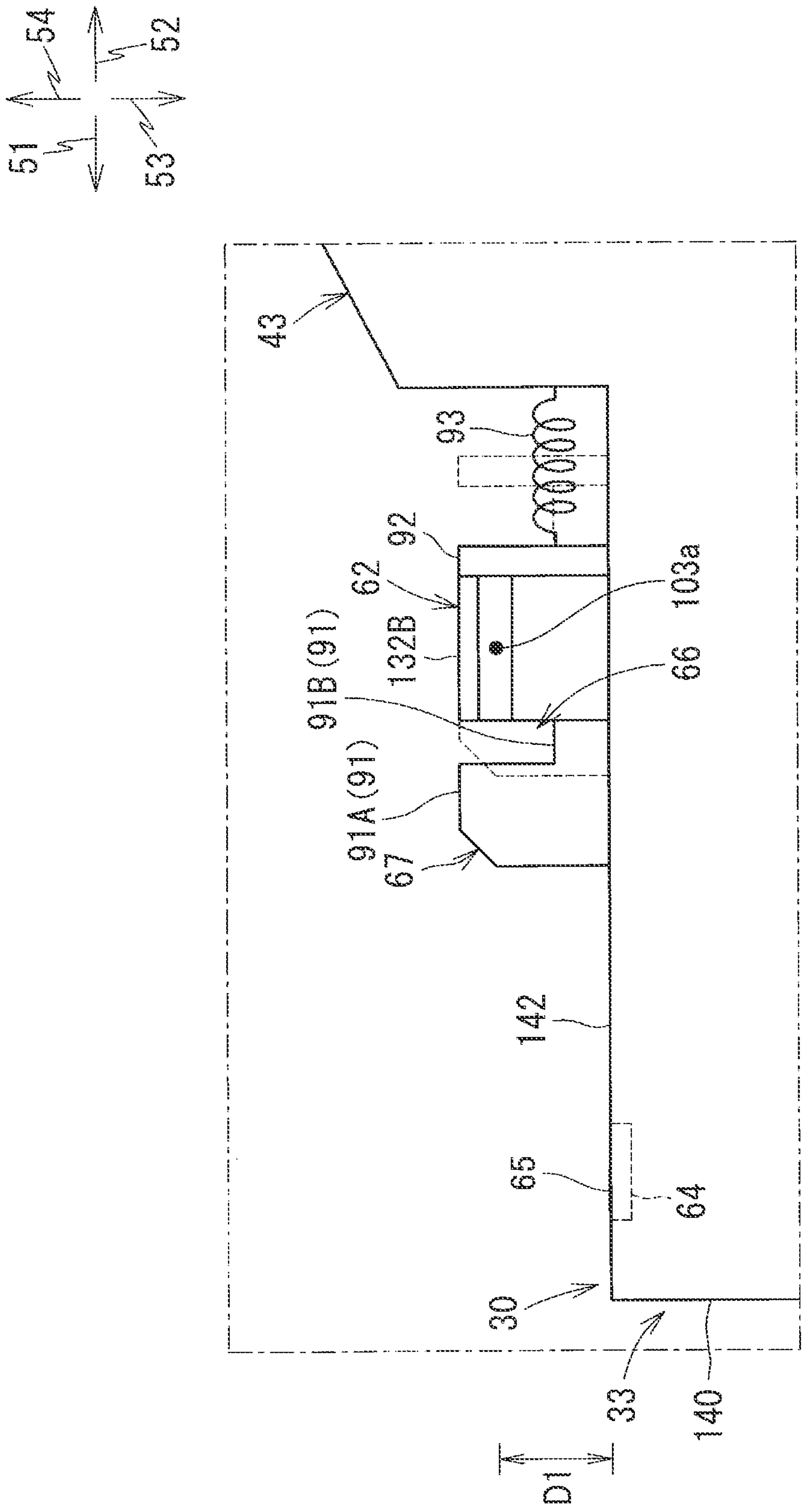
FIG. 5 is a partially enlarged right side view of the ink cartridge 30.

As illustrated in FIGS. 3 and 5, a plate member 67 is also provided on the upper surface 142 of the cartridge case 33 to protrude upward therefrom. The plate member 67 extends in the front-rear direction 51/52, and is positioned rearward of and above the electrode group 65. The plate member 67 includes the light-shielding plate 91 and a spring seat 92.

The light-shielding plate 91 has a flat plate shape extending in the front-rear direction 51/52. The light-shielding plate 91 includes a front portion 91A and a rear portion 91B. With respect to a height from the upper surface 142 in the up-down direction 53/54, the front portion 91A has a height greater than a height of the rear portion 91B. That is, the front portion 91A has an upper end positioned higher than an upper end of the rear portion 91B. Further, the upper end of the front portion 91A is positioned higher than a detecting position of the sensor 103 (the position of an optical path 103*a* formed by the light of the sensor 103). The detecting position of the sensor 103 is separated upward from the electrode group 65 by a first distance D1 in the upward direction 54 (see FIG. 5). Hence, during the insertion and removal of the ink cartridge 30 to and from the cartridge receiving portion 110, the front portion 91A can move across the optical path 103*a* of the sensor 103, so that the front portion 91A can be detected by the sensor 103. The upper end of the rear portion 91B is lower than the detecting position of the sensor 103. Hence, the rear portion 91B does not move across the optical path 103*a* of the sensor 103 during the insertion and removal of the ink cartridge 30 to and from the cartridge receiving portion 110. Accordingly, the rear portion 91B cannot be detected by the sensor 103.

Incidentally, the sensor 103 can detect the front portion 91A of the light-shielding plate 91 in a case where the light emitted from the light emitting portion is incident on the front portion 91A before arriving at the light receiving portion, since the intensity of the light received at the light receiving portion becomes less than the predetermined intensity, for example, zero. Note that the front portion 91A of the light-shielding plate 91 may perfectly block the light traveling in the left-right direction 55/56, or may partially attenuate the light, or may bend the light to change a traveling direction thereof, or may fully reflect the light.

The light-shielding plate 91 has a rear end connected to the spring seat 92. That is, the rear end of the rear portion 91B is connected to the spring seat 92. The spring seat 92 is a flat plate whose major surface extends in the up-down direction 53/54 and the left-right direction 55/56. The spring seat 92 is positioned rearward of the counter-detecting portion 62 and frontward of the protruding portion 43. The spring seat 92 is spaced apart from the protruding portion 43 to face the front surface of the protruding portion 43 in the front-rear direction 51/52. A coil spring 93 is interposed between the spring seat 92 and the front surface of the protruding portion 43 such that the coil spring 93 urges the spring seat 92 frontward. The light-shielding plate 91 extends frontward from the spring seat 92 such that the light-shielding plate 91 is positioned between the first reflection plate 132A and the second reflection plate 132B of the counter-detecting portion 62 in the left-right direction 55/56.

The plate member 67 is slidably movable in the front-rear direction 51/52 relative to the upper surface 142 of the cartridge case 33 between a first position and a second position. The first position of the plate member 67 is illustrated in FIG. 3 and is also indicated by a solid line in FIG. 5. The second position of the plate member 67 is indicated by a broken line in FIG. 5.

When the plate member 67 is at the first position, the spring seat 92 is in abutment of respective rear end faces of the first and second reflection plates 132A, 132B of the counter-detecting portion 62 due to the urging force of the coil spring 93. The plate member 67 is maintained at the first position by the abutment of the spring seat 92 with the first and second reflection plates 132A, 132B. In other words, the coil spring 93 urges the plate member 67 toward the first position. When the plate member 67 is at the first position, the front portion 91A of the light-shielding plate 91 is positioned frontward of the counter-detecting portion 62.

When the plate member 67 is at the first position, the front portion 91A of the light-shielding plate 91 and the reflection plates 132A, 132B define a space 66 therebetween in the front-rear direction 51/52, i.e., the space 66 is provided between the rear end of the front portion 91A and the front end of each reflection plate 132A, 132B in the front-rear direction 51/52. In other words, the front portion 91A of the light-shielding plate 91 and the reflection plates 132A, 132B are arrayed in the front-rear direction 51/52 with the space 66 interposed therebetween when the plate member 67 is at the first position. The space 66 is positioned above the rear portion 91B of the light-shielding plate 91, and provides communication in the left-right direction 55/56. At the first position of the plate member 67, the front portion 91A of the light-shielding plate 91 is positioned rearward of and above the electrode group 65 of the IC circuit board 64. The upper end of the front portion 91A of the light-shielding plate 91 is positioned between the first reflection plate 132A and the second reflection plate 132B in the left-right direction 55/56.

In a case where an external force acting in the rearward direction 52 is applied to the plate member 67, the plate member 67 is displaced in the rearward direction 52 from the first position to the second position against the urging force of the coil spring 93, as indicated by the broken line in FIG. 5. The front end of the light-shielding plate 91 is positioned closer to the reflection plates 132A, 132B in the front-rear direction 51/52 when the plate member 67 is at the second position than when the plate member 67 is at the first position.

When the plate member 67 is at the second position, a part of the front portion 91A of the light-shielding plate 91 enters in the gap between the first reflection plate 132A and the second reflection plate 132B. That is, the front portion 91A of the light-shielding plate 91 and the reflection plates 132A, 132B are overlapped with each other, at least partially, in the front-rear direction 51/52. Incidentally, when the plate member 67 is at the second position, an entirety of the front portion 91A may enter in the gap between the first reflection plate 132A and the second reflection plate 132B.

<Positional Relationship Among Counter-Detecting Portion 62, Electrode Group 65, and Light-Shielding Plate 91>

As illustrated in FIG. 6, the counter-detecting portion 62, the IC circuit board 64, and the light-shielding plate 91 are positioned on the upper surface 142 of the cartridge case 33. The light-shielding plate 91 (the front portion 91A) of the plate member 67 at its first position and the ground electrode 65C both intersect with an imaginary plane 180 extending in the up-down direction 53/54 and the front-rear direction 51/52 (as indicated by a dotted chain line in FIG. 6). The imaginary plane 180 is positioned at the center of the cartridge case 33 in the left-right direction 55/56. Further, the imaginary plane 180 is at a position coincident with the center in the left-right direction 55/56 of the light-shielding plate 91 of the plate member 67 at its first position. Hence, the center in the left-right direction 55/56 of the plate member 67 at its first position is coincident with the center in the left-right direction 55/56 of the cartridge case 33.

The center in the left-right direction 55/56 of the ground electrode 65C is contained in the imaginary plane 180. In other words, the center of the ground electrode 65C in the left-right direction 55/56 is positioned on the imaginary plane 180. The ground electrode 65C has a dimension L1 in the left-right direction 55/56 greater than a dimension L2 in the left-right direction 55/56 of the upper surface of the light-shielding plate 91 of the plate member 67 at its first position (L1>L2).

<Operation for Attaching Ink Cartridge 30 to Cartridge Receiving Portion 110>

Next, a process of attaching the ink cartridge 30 to the cartridge receiving portion 110 will be described.

Prior to the attachment of the ink cartridge 30 to the cartridge receiving portion 110, the ink supply opening 71 of the ink supply portion 34 is closed by the valve. Hence, outflow of the ink from the storage chamber 36 to the outside of the ink cartridge 30 is interrupted.

Further, in the cartridge receiving portion 110 before attachment of the ink cartridge 30 thereto, no member is positioned between the light emitting portion and the light receiving portion of the sensor 103. Therefore, a high-level signal is outputted from the sensor 103 to the controller 130 of the printer 10. Incidentally, at this time, a cover (not illustrated) of the printer 10 is opened, and the opening 112 of the cartridge receiving portion 110 is exposed to the outside.

As illustrated in FIG. 7, the ink cartridge 30 is inserted frontward into the casing 101 through the opening 112 of the cartridge receiving portion 110. As the ink cartridge 30 is inserted frontward, the front portion 91A of the light-shielding plate 91 of the plate member 67 at its first position comes to the position between the light emitting portion and the light receiving portion of the sensor 103. When the front end of the front portion 91A of the light-shielding plate 91 of the plate member 67 moves frontward past the optical path 103*a* of the sensor 103, the signal output to the controller 130 of the printer 10 is changed from the high-level signal to the low-level signal.

As the ink cartridge 30 is inserted further frontward, the space 66 then comes to the position between the light emitting portion and the light receiving portion of the sensor 103, as illustrated in FIG. 8. When the rear end of the front portion 91A of the light-shielding plate 91 of the plate member 67 at its first position moves past the optical path 103*a* of the sensor 103 frontward, the signal output to the controller 130 of the printer 10 is changed from the low-level signal to the high-level signal.

As the ink cartridge 30 is further inserted frontward into the cartridge receiving portion 110, the ink supply portion 34 enters inside the guide portion 105 and the ink needle 102 enters into the ink supply opening 71. In this way, the ink supply portion 34 is fixed in position, and the ink stored in the storage chamber 36 is now allowed to flow into the corresponding tube 20 through the ink needle 102.

Further, as illustrated in FIG. 9, the light-shielding plate 91 at the first position, which is moving frontward after passing through the position between the light emitting portion and the light receiving portion of the sensor 103, then enters into the corresponding slit 108. In the attached state, the counter-detecting portion 62 is positioned on the optical path 103*a* of the sensor 103, and the light-shielding plate 91 is located inside the slit 108.

Further, as illustrated in FIG. 10, the IC circuit board 64 arrives at the position immediately below the three contacts 106, so that the electrodes 65A, 65B, 65C of the electrode group 65 are respectively electrically connected to the corresponding contacts 106 while resiliently deforming the respective contacts 106 upward. Incidentally, at this time, the protruding portion 43 is in abutment with the locking portion (not illustrated) of the cartridge receiving portion 110, thereby maintaining the ink cartridge 30 in the attached state.

The controller 130 of the printer 10 is configured to determine whether the attachment of the ink cartridge 30 to the cartridge receiving portion 110 is complete based on the change in the output signal during the attachment process of the ink cartridge 30, as illustrated in FIG. 11. Specifically, the controller 130 determines that a proper ink cartridge 30 has been attached to the cartridge receiving portion 110 upon detection of the following change in the output of the signal from the sensor 103: from the high-level signal to the low-level signal (because of the interruption of the optical path 103*a* by the front portion 91A of the light-shielding plate 91 of the plate member 67 at the first position); and then from the low-level signal to the high-level signal (because of the presence of the space 66 at the optical path 103*a*), and then from the high-level signal to the low-level signal (because of the interruption of the optical path 103*a* by the counter-detecting portion 62). Here, the expression "proper ink cartridge 30" implies that the ink cartridge 30 is compatible with the printer 10 and stores a sufficient amount of ink in the sub-storage chamber 37 to perform printing (i.e., the ink cartridge 30 is neither empty nor near-empty).

The controller 130 determines that the ink cartridge 30 attached to the cartridge receiving portion 110 is abnormal when detecting any fluctuation different from that shown in FIG. 10 in the signal outputted from the sensor 103. In response to the determination, the controller 130 is configured to notify the user about the abnormality, for example, by displaying an error message on a display.

Incidentally, the controller 130 may be configured to start detecting whether the ink cartridge 30 is attached to the cartridge receiving portion 110 upon receipt of a signal from a cover sensor (not illustrated) indicating that the cover of the printer 10 closes the opening 112 of the cartridge receiving portion 110. In this case, the controller 130 may start accessing the IC circuit board 64 upon receipt of the signal from the cover sensor, and may determine that the ink cartridge 30 is attached to the cartridge receiving portion 110 when detecting that the information in the IC circuit board 64 is accessible (readable) normally or power supply to the IC circuit board 64 is performed.

For detaching the ink cartridge 30 from the cartridge receiving portion 110, the ink cartridge 30 is moved rearward such that the space 66 and the light-shielding plate 91 of the plate member 67 at the first position sequentially move rearward past the optical path 103*a* of the sensor 103. Hence, the signal outputted from the sensor 103 to the controller 130 is changed from the high-level signal to the low-level signal, and then from the low-level signal to the high-level signal.

The change in the output signal attributed to the detection of the front portion 91A of the light-shielding plate 91 at the sensor 103 may be used to determine whether or not the ink cartridge 30 is attached to the cartridge receiving portion 110, or to identify the type of the ink cartridge 30 attached to the cartridge receiving portion 110 (for example, to identify the color of the ink stored in the ink cartridge 30).

<Movement of Plate Member 67>

In the process for attaching the ink cartridge 30 to the cartridge receiving portion 110, conceivably, the light-shielding plate 91 of the plate member 67 at the first position may not enter into the slit 108 but may abut on the wall surface 107 where the slit 108 is open, if the ink cartridge 30 is tilted relative to the casing 101 with the upper and lower end portions of the ink cartridge 30 received in the corresponding guide grooves 109 of the casing 101.

Here, assume that the ink cartridge 30 is moved frontward in a state where the light-shielding plate 91 of the plate member 67 at the first position is in contact with the wall surface 107 rather than entering into the corresponding slit 108. The plate member 67 at the first position is relatively pushed rearward by the wall surface 107 in the rearward direction 52. As a result, the plate member 67 is caused to shift from the first position to the second position against the urging force of the coil spring 93, as illustrated in FIG. 12. With this structure, attachment of the ink cartridge 30 to the cartridge receiving portion 110 can be realized even if the light-shielding plate 91 is not received in the corresponding slit 108.

FUNCTIONS AND TECHNICAL ADVANTAGES OF THE EMBODIMENT

According to the present embodiment, detection by the sensor 103 can be performed through the plate member 67 at the first position, the space 66, and the counter-detecting portion 62. The plate member 67 is allowed to move to the second position from the first position during the attachment of the ink cartridge 30 to the printer 10 or in response to impact impinged on the ink cartridge 30 by an accidental fall of the ink cartridge 30. With this structure, the plate member 67 is hard to get damaged.

In the ink cartridge 30, interference between the sensor 103 and the ground electrode 65C is less likely to occur, since the light-shielding plate 91 and the ground electrode 65C are positioned to intersect the imaginary plane 180 positioned at the center of the cartridge case 33 in the left-right direction 55/56. Further, the electrical contact between the ground electrode 65C and the contact 106 can be stably secured even in a case where the ink cartridge 30 attached to the cartridge receiving portion 110 is slanted relative to the front-rear direction 51/52 as a result of the tilting movement of ink cartridge 30 during the attachment process. Further, even in the case where the ink cartridge 30 is attached to the cartridge receiving portion 110 in a tilted posture relative to the front-rear direction 51/52 as a result of such unstable insertion process of the ink cartridge 30, the positions of the front and rear ends of the front portion 91A of the light-shielding plate 91 are less likely to be displaced.

Further, since the space 66 is provided between the front portion 91A of the light-shielding plate 91 and the counter-detecting portion 62 in the front-rear direction 51/52, the rear end of the front portion 91A of the light-shielding plate 91 can be optically detected easily. Further, in the waveform of the output signal of the sensor 103, the detection of the front portion 91A of the light-shielding plate 91 and the detection of the counter-detecting portion 62 are clearly distinguished from each other. Further, the position where the front portion 91A of the light-shielding plate 91 is optically detected and the position where the counter-detecting portion 62 is optically detected can be overlapped with each other in the up-down direction 53/54.

Further, the dimension L1 in the left-right direction 55/56 of the ground electrode 65C is greater than the dimension L2 in the left-right direction 55/56 of the upper surface of the light-shielding plate 91. This configuration can suppress interference of the light-shielding plate 91 with the sensor 103 even if the ink cartridge 30 is tilted in the attached state.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

According to the embodiment described above, the plate member 67 is movable in the front-rear direction 51/52. Instead, a plate member may be configured to have flexibility in the front-rear direction 51/52. That is, in the above-described embodiment, the plate member 67 is movable in the front-rear direction 51/52 to realize a change in posture of the plate member. In contrast, as a modification, the change in posture of the plate member may be realized by a change in shape of the plate member.

Specifically, FIG. 13 illustrates an ink cartridge 30A according to a first modification, wherein like parts and components are designated by the same reference numerals as those shown in FIGS. 1 through 12.

As illustrated in FIG. 13, a plate member 68 is positioned rearward of the electrode group 65 and frontward of the counter-detecting portion 62. The plate member 68 has a rear end portion fixed to the upper surface 142 of the cartridge case 33, and a front end portion unfixed to the cartridge case 33. The plate member 68 has a shape the same as the shape of the front portion 91A of the light-shielding plate 91. Thus, the space 66 is provided between the plate member 68 and the counter-detecting portion 62. The plate member 68 is made from a material having flexibility (or a resiliently deformable member), such as rubber and elastomer. In a state where no external force is applied to the plate member 68, the plate member 68 is at the first position. In a case where an external force acting in the rearward direction 52 is applied to a front portion of the plate member 68, the front portion of the plate member 68 is deformed such that its front end portion is displaced rearward, thereby moving the plate member 68 into the second position from the first position.

Further, in the above-described embodiment, the space 66 is provided between the front portion 91A of the light-shielding plate 91 and the counter-detecting portion 62 in the front-rear direction 51/52. Alternatively, instead of the space 66, a light transmissive member may be provided between the front portion 91A of the light-shielding plate 91 and the counter-detecting portion 62 in the front-rear direction 51/52. The light transmissive member may be: a part of the rear portion 91B of the light-shielding plate 91; or a part of the counter-detecting portion 62; or an independent member.

Further, in the above-described embodiment, the electrode group 65 includes the power source electrode 65A, the signal electrode 65B and the ground electrode 65C. In this connection, FIG. 14 illustrates an ink cartridge 30B according to a second modification in which a dummy electrode 65D is further provided beside and outside of the power source electrode 65A. Alternatively, the dummy electrode 65D may be positioned beside and outside of the signal electrode 65B. In other words, the power source electrode 65A or the signal electrode 65B may be positioned in between the dummy electrode 65D and the ground electrode 65C in the left-right direction 55/56.

FIG. 15 illustrates an ink cartridge 30C according to a third modification. The ink cartridge 30C includes an IC circuit board 64C that includes a circuit board 80, the electrode group 65, an electrical circuit 81, and a battery 82. The electrode group 65 is positioned on an upper surface of the circuit board 80, whereas the electrical circuit 81 and battery 82 are mounted on a lower surface of the circuit board 80. The IC circuit board 64C is provided on the upper surface 142 such that an entirety of the upper surface of the IC circuit board 64C is not exposed to the outside. That is, only a part of the upper surface of the circuit board 80 is exposed to the outside, the part being provided with the electrode group 65, and a remaining part of the upper surface of the IC circuit board 64C may be covered by the cartridge case 33 so as not to be exposed to the outside. An enlarged view of the lower surface of the IC circuit board 64C is illustrated in FIG. 15 in a region enclosed by a two-dotted chain line.

Further, FIG. 16 illustrates an ink cartridge 30D according to a fourth modification. The ink cartridge 30D includes a plate member 67D configured of a light-shielding plate 91D and the spring seat 92. The light-shielding plate 91D has a front portion 91AD whose front end portion has a dimension L3 in the left-right direction 55/56 greater than the dimension L1 in the left-right direction 55/56 of the ground electrode 65C (L1<L3). With this structure, the front portion 91AD of the light-shielding plate 91D at the first position does not enter into the slit 108, but the light-shielding plate 91D is moved rearward to shift to the second position (as in the state shown in FIG. 12) during the attachment process of the ink cartridge 30D to the cartridge receiving portion 110. Alternatively, an entirety of the light-shielding plate 91D (both the front portion 91AD and the rear portion 91B) or a portion of the front portion 91AD may have a dimension in the left-right direction 55/56 greater than the dimension L1 in the left-right direction 55/56 of the ground electrode 65C. In this case, the gap between the first reflection plate 132A and the second reflection plate 132B may be designed to define a distance in the left-right direction 55/56 greater than the maximum dimension in the left-right direction 55/56 of the light-shielding plate 91D.

Further, the ink cartridge 30 may not include the internal frame 35. In this case, the storage chamber 36 may be defined as an inner space of the cartridge case 33 that constitutes an outer shell of the ink cartridge 30.

In the embodiment described above, the counter-detecting portion 62 is configured to change a state of the signal outputted from the sensor 103 to the controller 130 according to the amount of the ink stored in the storage chamber 36, but configurations other than that in the embodiment may be employed. For example, the counter-detecting portion 62 may change a state of light outputted from a sensor in the printer 10 when attachment of the ink cartridge 30 to the cartridge-attachment section 110 is completed so that the printer 10 can detect that the ink cartridge 30 has been completely attached to the cartridge-attachment section 110. In this case, the counter-detecting portion 62 (at least the first reflection plate 132A) may be formed or may be colored such that these components have low light transmittance. Still further, the counter-detecting portion 62 may be so configured that arbitrary information on the ink cartridge 30 attached to the printer 10 can be detected by the printer 10.

In the above-described embodiment, the ink is used as an example of liquid of the disclosure. However, instead of the ink, pretreatment liquid configured to be ejected onto a sheet prior to the ejection of the ink for printing may be stored in the liquid cartridge as the liquid. As an alternative, cleaning liquid for cleaning the recording head 21 may be stored in the liquid cartridge.

<Remarks>

The ink cartridge 30 is an example of a liquid cartridge. The cartridge case 33 is an example of a cartridge case of the liquid cartridge. The ink supply portion 34 is an example of a liquid supply portion. The IC circuit board 64 is a circuit board. The electrode group 65 is an example of an electrode group. The light-shielding plate 91, 68 is an example of a plate member. The counter-detecting portion 62 is an example of a residual-amount detecting portion. The counter-detecting portion 62 is another example of a cartridge detecting portion. The first reflection plate 132A and second reflection plate 132B are an example of an optical access portion. The space 66 is an example of a light transmissive region. The prism 131 is an example of a prism. The first reflecting portion 132A is an example of a first reflecting portion, and the second reflection plate 132B is an example of a second reflecting portion. The power source electrode 65A is an example of a first electrode. The signal electrode 65B is an example of a second electrode. The ground electrode 65C is an example of a third electrode. The coil spring 93 is an example of an urging member. The imaginary plane 180 is an example of an imaginary plane. The printer 10 is an example of a liquid consuming device. The cartridge receiving portion 110 is an example of cartridge receiving portion. The recording head 21 is an example of a consuming portion. The ink needle 102 is an example of a liquid supply tube. The contacts 106 are an example of a contact. The sensor 103 is an example of a sensor.

What is claimed is:

1. A liquid cartridge attachable to a printer in an attached posture by being moved in a front-rear direction crossing an up-down direction along a gravitational direction, the liquid cartridge comprising:

a cartridge case defining a liquid storage chamber therein;

a liquid supply portion protruding frontward from a front surface of the cartridge case and configured to supply liquid stored in the liquid storage chamber to an outside of the liquid storage chamber;

a circuit board comprising an electrode group comprising at least three electrodes, the at least three electrodes facing upward and being exposed to the outside in the attached posture;

a plate member, the plate member being positioned rearward and upward of the electrode group in the attached posture, the plate member extending in the front-rear direction in the attached posture and having a front end movable in the front-rear direction; and a residual-amount detecting portion configured to change a state of incident light according to an amount of the liquid stored in the liquid storage chamber, the residual-amount detecting portion comprising an optical access portion accessible by light traveling in a left-right direction crossing the up-down direction and the front-rear direction in the attached posture, the optical access portion including a portion positioned above and away from the electrode group by a first distance, wherein the plate member is movable between a first position and a second position, the plate member having a portion positioned frontward of the optical access portion and above and away from the electrode group by the first distance when the plate member is at the first position, the front end of the plate member being positioned closer to the residual-amount detecting portion when the plate member is at the second position than when the plate member is at the first position, and wherein the plate member at the first position and the residual-amount detecting portion define a light transmissive region therebetween in the front-rear direction, the light transmissive region having a light transmittance higher than a light transmittance of the plate member.

2. The liquid cartridge according to claim 1, wherein the residual-amount detecting portion further comprises a prism having a reflection surface whose reflection manner is dependent on whether or not the reflection surface is in contact with the liquid, and wherein the optical access portion comprises:

a first reflecting portion configured to receive the light traveling in the left-right direction and reflect the light toward the prism; and a second reflecting portion configured to receive the light from the prism when the light from the prism is incident on the second reflecting portion, and reflect the received light outward in the left-right direction.

3. The liquid cartridge according to claim 2, wherein the first reflecting portion and the second reflecting portion are positioned to be spaced apart from each other in the left-right direction, and wherein the plate member is slidably movable in the front-rear direction, the portion of the plate member being positioned between the first reflecting portion and the second reflecting portion in the left-right direction when the plate member is at the second position.

4. The liquid cartridge according to claim 3, wherein the electrode group comprises a first electrode, a second electrode, and a third electrode arrayed in the left-right direction such that the third electrode is positioned between the first electrode and the second electrode in the left-right direction, each of the first electrode, the second electrode and the third electrode being configured to be electrically connected to the printer when the liquid cartridge is attached to the printer, wherein the third electrode is a ground electrode for grounding, and wherein the third electrode and an upper end of the plate member are arranged to intersect an imaginary plane extending in the up-down direction and the front-rear direction.

5. The liquid cartridge according to claim 3, further comprising an urging member resiliently urging the plate member toward the first position.

6. The liquid cartridge according to claim 1, wherein the plate member has a portion having flexibility in the front-rear direction.

7. The liquid cartridge according to claim 1, wherein the light transmissive region is provided by a space.

8. The liquid cartridge according to claim 1, wherein the light traveling in the left-right direction is configured to be incident on each of the plate member and the optical access portion during a process for attaching the liquid cartridge to the printer.

9. A liquid cartridge comprising:

a cartridge case defining a liquid storage chamber therein;

a liquid supply portion protruding frontward from a front surface of the cartridge case in a front-rear direction and configured to supply liquid stored in the liquid storage chamber to an outside of the liquid storage chamber;

a circuit board positioned upward relative to and away from the liquid supply portion in an up-down direction crossing the front-rear direction, the circuit board comprising an electrode group comprising at least three electrodes facing upward in the up-down direction and being exposed to the outside;

a plate member positioned rearward and upward of the electrode group in the up-down direction, the plate member extending in the front-rear direction and having a front end movable in the front-rear direction; and a cartridge detecting portion comprising an optical access portion positioned upward relative to the electrode group in the up-down direction and rearward of the plate member in the front-rear direction, the optical access portion being accessible by light traveling in a left-right direction crossing the up-down direction and the front-rear direction, the optical access portion including a portion positioned above and away from the electrode group by a first distance in the up-down direction, wherein the plate member is movable between a first position and a second position, the plate member having a portion positioned frontward of the optical access portion and above and away from the electrode group by the first distance when the plate member is at the first position, the front end of the plate member being positioned closer to the cartridge detecting portion when the plate member is at the second position than when the plate member is at the first position, and wherein the plate member at the first position and the cartridge detecting portion are spaced apart from each other in the front-rear direction.

10. The liquid cartridge according to claim 9, wherein the cartridge detecting portion is configured to change a state of incident light according to an amount of the liquid stored in the liquid storage chamber.

11. The liquid cartridge according to claim 10, wherein the cartridge detecting portion further comprises a prism having a reflection surface whose reflection manner is dependent on whether or not the reflection surface is in contact with the liquid stored in the liquid storage chamber, and wherein the optical access portion comprises:

a first reflecting portion configured to receive the light traveling in the left-right direction and reflect the light toward the prism; and a second reflecting portion configured to receive the light from the prism when the light from the prism is incident on the second reflecting portion, and reflect the received light outward in the left-right direction.

12. The liquid cartridge according to claim 11, wherein the first reflecting portion and the second reflecting portion are positioned to be spaced apart from each other in the left-right direction, and wherein the plate member is slidably movable in the front-rear direction, the portion of the plate member being positioned between the first reflecting portion and the second reflecting portion in the left-right direction when the plate member is at the second position.

13. The liquid cartridge according to claim 12, further comprising an urging member resiliently urging the plate member toward the first position.

14. The liquid cartridge according to claim 9, wherein the electrode group comprises a first electrode, a second electrode, and a third electrode arrayed in the left-right direction such that the third electrode is positioned between the first electrode and the second electrode in the left-right direction, wherein the third electrode is a ground electrode for grounding, and wherein the third electrode and an upper end of the plate member are arranged to intersect an imaginary plane extending in the up-down direction and the front-rear direction.

15. The liquid cartridge according to claim 9, wherein the plate member has a portion having flexibility in the front-rear direction.

16. The liquid cartridge according to claim 9, wherein the light traveling in the left-right direction is configured to be incident on each of the plate member and the optical access portion during a process for attaching the liquid cartridge to a printer.

* * * * *